US011858757B2

(12) United States Patent
Hiroe et al.

(10) Patent No.: US 11,858,757 B2
(45) Date of Patent: Jan. 2, 2024

(54) CONTROL DEVICE, GRANULAR MATERIAL SUPPLY SYSTEM, CONTROL METHOD, AND PROGRAM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Akihiko Saito, Tokyo (JP); Kei Moriyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/069,540

(22) Filed: Dec. 21, 2022

(65) Prior Publication Data

US 2023/0202778 A1 Jun. 29, 2023

(30) Foreign Application Priority Data

Dec. 28, 2021 (JP) ................................. 2021-214351

(51) Int. Cl.
| | |
|---|---|
| *B65G 53/16* | (2006.01) |
| *B65G 53/66* | (2006.01) |
| *B65G 53/40* | (2006.01) |
| *B65G 53/06* | (2006.01) |
| *B65G 3/04* | (2006.01) |

(52) U.S. Cl.
CPC .............. *B65G 53/66* (2013.01); *B65G 3/04* (2013.01); *B65G 53/06* (2013.01); *B65G 53/40* (2013.01); *B65G 2201/042* (2013.01)

(58) Field of Classification Search
USPC ......................................................... 406/30
See application file for complete search history.

(56) References Cited

U.S. PATENT DOCUMENTS 3,437,384 A * 4/1969 Bozich ............... B65G 53/4691
406/30
4,059,310 A * 11/1977 Waskiewicz ........... B65G 53/66
406/65

(Continued)

FOREIGN PATENT DOCUMENTS

| CN | 109969794 A | * | 7/2019 | |
| JP | 59213435 A | * | 12/1984 | ............. B65G 53/66 |

(Continued)

*Primary Examiner* — Joseph A Dillon, Jr.
(74) *Attorney, Agent, or Firm* — Osha Bergman Watanabe & Burton LLP

(57) ABSTRACT

In a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line, a control device includes a density control unit configured to control a density of the granular material on a downstream side of a junction of the cutout line and the carrier line to a set value predetermined and a flow rate control unit configured to control a flow rate of the granular material to be supplied to the carrier destination through the carrier line to a command value instructed by the carrier destination.

10 Claims, 18 Drawing Sheets

(56) References Cited

U.S. PATENT DOCUMENTS

| | | | | |
|---|---|---|---|---|
| 4,502,819 | A * | 3/1985 | Fujii | B65G 53/22 406/14 |
| 4,521,139 | A * | 6/1985 | Kretschmer | C21B 5/003 406/142 |
| 4,613,259 | A * | 9/1986 | Packer | B05B 7/1404 406/14 |
| 4,791,817 | A * | 12/1988 | Albertz | G01F 1/74 73/861.04 |
| 4,936,870 | A * | 6/1990 | Baumann | C10J 3/50 406/197 |
| 6,287,056 | B1 * | 9/2001 | Szikszay | B65G 53/66 406/146 |
| 6,447,215 | B1 * | 9/2002 | Wellmar | B65G 53/66 406/122 |
| 7,114,889 | B2 * | 10/2006 | Kanou | C12N 1/145 406/14 |
| 7,144,203 | B2 * | 12/2006 | Gerber | B65G 53/66 406/14 |
| 8,747,029 | B2 * | 6/2014 | Thorn | B65G 53/66 406/197 |
| 8,915,679 | B2 * | 12/2014 | Walukiewicz | B65G 53/66 406/30 |
| 9,122,280 | B2 * | 9/2015 | Fu | G05D 7/0605 |
| 9,573,775 | B2 * | 2/2017 | Shimono | F27D 3/16 |
| 9,745,149 | B2 * | 8/2017 | Brewster | B65G 53/66 |
| 10,207,878 | B1 * | 2/2019 | Johnson | B65G 53/66 |
| 10,227,186 | B2 * | 3/2019 | De Jager | B65G 53/16 |
| 10,705,546 | B2 * | 7/2020 | Tseng | G05D 7/0647 |
| 10,752,451 | B2 * | 8/2020 | Baker | B65G 51/00 |
| 11,365,071 | B2 * | 6/2022 | Brewster | B65G 53/24 |
| 2006/0056924 | A1 * | 3/2006 | Jurkovich | B65G 53/66 406/33 |
| 2016/0096693 | A1 * | 4/2016 | Hanaoka | B65G 53/26 406/19 |

FOREIGN PATENT DOCUMENTS

| | | |
|---|---|---|
| JP | S62-215424 A | 9/1987 |
| JP | H04-008338 B2 | 2/1992 |
| JP | H09-208050 A | 8/1997 |
| JP | H1111671 A * | 1/1999 |
| JP | 2004035913 A * | 2/2004 |
| JP | 2020-179950 A | 11/2020 |

* cited by examiner

CONTROL DEVICE, GRANULAR MATERIAL SUPPLY SYSTEM, CONTROL METHOD, AND PROGRAM

CROSS-REFERENCE TO RELATED APPLICATIONS

This application claims the benefit of priority to Japanese Patent Application Number 2021-214351 filed on Dec. 28, 2021. The entire contents of the above-identified application are hereby incorporated by reference.

TECHNICAL FIELD

The disclosure relates to a control device, a granular material supply system, a control method, and a program.

RELATED ART

JP 62-215424 A discloses a granular material supply facility in which a granulated reactant is mixed with an inert gas and fed into a metallurgical reaction container. FIG. 12 illustrates an example of a granular material supply facility 100'. The granular material supply facility 100' includes a blow tank 2 and a control device 20' and conveys and supplies granular material to a supply destination facility 10. An upper portion of the blow tank 2 is provided with a pressurization line 5 including a pressure control device PIC 4 and a pressure regulation valve V1 for the purpose of feedback control of the internal pressure of the blow tank 2. The granular material pulverized by a pulverizer not illustrated is supplied to the blow tank 2 through the pressurization line 5. In the granular material supply facility 100', granular material is supplied to the blow tank 2 through the pressurization line 5, and the granular material is accumulated in the blow tank 2.

On the other hand, a high-pressure loss aerator 3 for fluidizing the internal granular material is attached to a lower portion of the blow tank 2. When an aeration gas is supplied to the aerator 3 via an aeration line 6, the granular material in the blow tank 2 is fluidized and cut out (flown out) to a cutout line 9 due to the differential pressure between the blow tank 2 and a carrier line 7. In this manner, the granular material in the blow tank 2 is supplied to the carrier line 7 through the cutout line 9 and supplied to the supply destination facility 10 by a carrier gas flowing through the carrier line 7.

A load detector 1, such as a load cell, is attached to the blow tank 2, and the weight of the blow tank 2 including the granular material is measured by the load detector 1. The aeration line 6 is provided with an aeration gas flow rate control valve V2, and the flow rate of the gas to be supplied via the aeration line 6 can be controlled by adjusting the opening degree of the aeration gas flow rate control valve V2. The cutout line 9 is provided with a cutout flow rate control valve V3, and the flow rate of granular material to be supplied to the cutout line 9 can be controlled by adjusting the opening degree of the cutout flow rate control valve V3. The upstream side of the cutout flow rate control valve V3 in the cutout line 9 is provided with a flow velocity sensor C1 and a density sensor C2, and the flow velocity and the density of the granular material cut out to the cutout line 9 are measured by the respective sensors. The weight of the granular material cut out from the blow tank 2 to the cutout line 9 can be detected by the weight measured by the load detector 1. The carrier line 7 is provided with a flow rate control device FIC 8 and a carrier gas flow rate control valve V4 for the purpose of feedback control of the flow rate of the carrier gas, and the flow rate of the carrier gas is controlled to a desired flow rate. A blower not illustrated or the like is used to flow the carrier gas. Since the operation of the blower requires power such as electric power, reducing the carrier gas and reducing the flow velocity contribute to improvement of efficiency. However, when the flow rate of the carrier gas is reduced, the granular material settles at the bottom of the carrier line 7, causing the carrier line 7 to be blocked. JP 62-215424 A requires the particle velocity of the granular material to be at least about 5 m/s or greater from the viewpoint of stable transportation, that is, prevention of blockage.

JP 62-215424 A discloses a supply control method of granular material including obtaining in advance a particle velocity of granular material to prevent blockage of the carrier line 7, determining a carrier gas flow rate from the amount of granular material cut out to the cutout line 9 based on the amount of carrier gas to maintain this particle velocity, and controlling the carrier gas flow rate control valve V4 so as to achieve this carrier gas flow rate. This control needs to grasp the amount of granular material to be cut out, but the accuracy of the carrier flow rate (kg/s) of granular material depends on the time rate of change dm/dt of a weight m (kg) of the blow tank 2 including the granular material indicated by the load detector 1. (Although accuracy of the cutout flow rate (kg/s) by the action of the aerator 3 and the like also affect, the present disclosure does not discuss the accuracy of the cutout flow rate) Since the weight of the blow tank 2 that is a container of the granular material is larger than the weight of the granular material to be measured, it is difficult for the load detector 1 to accurately measure the weight of the granular material. The cutout flow rate (kg/s) of the granular material can be expressed by a weight change per second, but for example, if the cutout flow rate per second is 1 kg/s, the resolution of the load detector 1 needs to be about 0.1 kg. However, when the weight of the blow tank 2 is several tons, it is difficult for an inexpensive meter to measure the weight of the granular material.

To solve such a problem, the following control method is provided. That is, a particle velocity $v_{P2}$ (m/s) of the cut out granular material and a density $\rho_2$ (kg/m$^3$) of the granular material in the mixture of the gas flowing out of the blow tank 2, such as the aeration gas flow rate and the pressurized gas flow rate, and the cut out granular material are measured by the flow velocity sensor C1 and the density sensor C2, respectively, and a cutout flow rate $g_{P2}$ (kg/s) of the granular material is calculated by Equation (1) below from a pipe cross-sectional area $A_2$ of the carrier line 7.

$$g_{P2} = A_2 \cdot v_{P2} \cdot \rho_2 \qquad (1)$$

Then, a control device 20' adjusts the opening degree of the cutout flow rate control valve V3 by proportional-integral control (PI control) and makes the cutout flow rate (kg/s) estimated by the equation (1) coincide with the command value. For example, closing the cutout flow rate control valve V3 increases the downstream pressure on the blow tank 2 and thus decreases the cutout flow rate $g_{P2}$ (kg/s). Conversely, opening the cutout flow rate control valve V3 decreases the downstream pressure on the blow tank 2 and thus increases the cutout flow rate $g_{P2}$ (kg/s). In this manner, the cutout flow rate $g_{P2}$ (kg/s) is adjusted.

Unfortunately, when the carrier destination facility 10 is far away from the blow tank 2, the above control method has the following problems. For example, when the granular material is carried with the carrier gas flow rate being controlled to 5 m/s, it takes 20 seconds for the granular material to reach the carrier destination if the length of the carrier pipe from the junction of the cutout line 9 and the carrier line 7 to the carrier destination facility 10 is 100 m. That is, it will take 20 seconds for the increase or decrease in the granular material flow rate due to the opening and closing the cutout flow rate control valve V3 to reach the carrier destination. If the granular material supply facility 100' is used for supplying a combustible raw material such as coal to a reactor furnace, a delay of 20 seconds is significant. The moisture and composition of the raw material such as coal are not uniform and unavoidably fluctuate temporally. Thus, the temperature and pressure of the reactor furnace are adjusted by adjusting the supply flow rate of the raw material. The delay of 20 seconds fluctuates the composition of chemical species in the furnace and unavoidably causes environmental losses such as an increase in emission of air pollutants such as nitrogen oxides, and economic losses such as shortening of the life of the reactor furnace due to fluctuation in the combustion temperatures.

To eliminate the delay in arrival of the granular material at the carrier destination, it is conceivable to not make the flow rate constant but increase or decrease the flow rate of the carrier gas. When the density of the granular material portion of the mixture composed of the carrier gas and the granular material (the ratio of the weight of the granular material in the mixture) immediately after a junction P1 is $\rho_3$ (kg/m$^3$), a mass flow rate $g_{3P}$ of the granular material at the junction is expressed by the product of $\rho_3$ (kg/m$^3$) and a volume flow rate U (m$^3$/s) of the carrier line 7 downstream of the junction P1. When the flow rate of the carrier gas flowing through the carrier line 7 is $g_{G1}$ (kg/s), the flow rate of the gas, such as the aeration gas and the pressurized gas, flowing out of the blow tank 2 is $g_{G2}$ (kg/s), the density of a granular material component is $\rho_P$ (kg/m$^3$), and the density of the carrier gas component and a gas component flowing out of the blow tank 2 is $\rho_G$ (kg/m$^3$), the volume flow rate U of the carrier line 7 is expressed by Equation (2) below. The density $\rho_P$ (kg/m$^3$) of the granular material component and the density $\rho_G$ (kg/m$^3$) of the carrier gas component can be treated as fixed values determined by the type of granular material and the operation state of the granular material supply facility 100'.

Equation 1

$$U = \frac{g_{G1} + g_{G2}}{\rho_G} + \frac{g_{P2}}{\rho_P} \quad (2)$$

The mass flow rate $g_{3P}$ (kg/s) of the granular material at the junction P1 is expressed by Equation (3) below as the product of the density and the volume flow rate.

$$g_{3P}(t) = \rho_3(t) \cdot U(t) \quad (3)$$

When the density of the granular material at the junction P1 at time t is described as $\rho_3$ (t), it takes 20 seconds for the granular material to reach the supply destination facility 10, and thus the granular material density at the supply destination at the time t can be approximated by the granular material $\rho_3$ at the junction at time t−20. That is, the supply flow rate $g_{P4}$ (kg/s) of the granular material to the carrier destination at the time t can be approximately expressed by the following equation.

Equation 2

$$g_{P4}(t) \approx \rho_3(t-20) \cdot U(t) \quad (4)$$

It takes 20 seconds for the density of the granular material at the junction P1 to propagate to the carrier destination facility 10, but the volume flow rate U characteristically propagates without delay. Thus, the supply flow rate $g_{P4}$ (t) of the granular material to the carrier destination facility 10 at the time t is proportional to, for example, the carrier gas flow rate $g_{G1}$ (t) at the time t, and $g_{P4}$ (t) can be adjusted without delay by changing the opening degree of the carrier gas flow rate control valve V4. The volume flow rate can be similarly changed by changing the total flow rate $g_{G2}$ (kg/s) of the aeration gas and the pressurized gas. However, simply increasing the carrier gas flow rate $g_{G1}$ increases only the volume percent of the carrier gas and decreases the density $\rho_3$ of the granular material at the junction P1. Conversely, decreasing the carrier gas flow rate $g_{G1}$ (kg/s) decreases the volume percent of the carrier gas and increases the density $\rho_3$ of the granular material at the junction P1. These are side effects of adjusting the granular material supply flow rate $g_{P4}$ (kg/s) to the carrier destination facility 10 only by using the carrier gas flow rate $g_{G1}$ (kg/s) (or the gas flow rate $g_{G2}$). FIG. 13 illustrates a schematic view explaining this side effect. FIG. 13 illustrates how sparseness and denseness of granular material density is generated in the carrier line 7 when a sine wave variation of a constant cycle is applied to the carrier gas flow rate $g_{G1}$. Increasing the carrier gas flow rate $g_{G1}$ (kg/s) also increases the granular material supply flow rate $g_{P4}$ (kg/s) to the carrier destination in proportion to the increase as described in the equation (2). However, simply changing the flow rate $g_{G1}$ of the carrier gas without considering the cutout amount of the granular material causes sparseness and denseness of the granular material density $\rho_3$ (kg/s) in the carrier line 7 as illustrated in FIG. 13. As indicated by the equation (4), since the granular material supply flow rate $g_{P4}$ (kg/s) to the carrier destination is also proportional to the fluctuation in the granular material density, and thus simply changing the flow rate $g_{G1}$ of the carrier gas cannot supply an intended amount of granular material to the carrier destination facility 10. On the other hand, JP 2020-179950 A discloses a control of adjusting the flow rate of the carrier gas so that the measured density falls within a predetermined range by providing a density measurement device that measures the density of granular material flowing in the carrier line 7.

Such known techniques control the supply amount of granular material with the function of controlling the flow rate of carrier gas to a predetermined value and the function of controlling the granular material flow rate (cutout flow rate) to a predetermined value. Unfortunately, particularly when the carrier line is long as described above, the granular material cannot be supplied at a flow rate as commanded due to the delay of the response of the actual flow rate of the granular material to the change of the command value of the granular material flow rate or the sparseness and denseness of the granular material generated in the carrier line 7.

SUMMARY

Control for supplying granular material at a flow rate as commanded even when the carrier line 7 is long is awaited.

The present disclosure provides a control device, a granular material supply system, a control method, and a program that can solve the above problems.

A control device of the present disclosure in a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line includes a density control unit configured to control a density of the granular material on a downstream side of a junction of the cutout line and the carrier line to a set value predetermined and a flow rate control unit configured to control a flow rate of the granular material to be supplied to the carrier destination through the carrier line to a command value instructed by the carrier destination.

A control method of the present disclosure in a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line includes controlling a density of the granular material on a downstream side of a junction of the cutout line and the carrier line to a set value predetermined and controlling a flow rate of the granular material to be supplied to the carrier destination through the carrier line to a command value instructed by the carrier destination.

A program of the present disclosure causes a computer configured to control a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line to execute processing of controlling a density of the granular material on a downstream side of a junction of the cutout line and the carrier line to a set value predetermined and controlling a flow rate of the granular material to be supplied to the carrier destination through the carrier line to a command value instructed by the carrier destination.

According to the control device, the granular material supply system, the control method, and the program described above, granular material can be supplied to a carrier destination at a flow rate as commanded.

BRIEF DESCRIPTION OF DRAWINGS

The disclosure will be described with reference to the accompanying drawings, wherein like numbers reference like elements.

DESCRIPTION OF EMBODIMENTS

First Embodiment

Configuration

Figure 1:
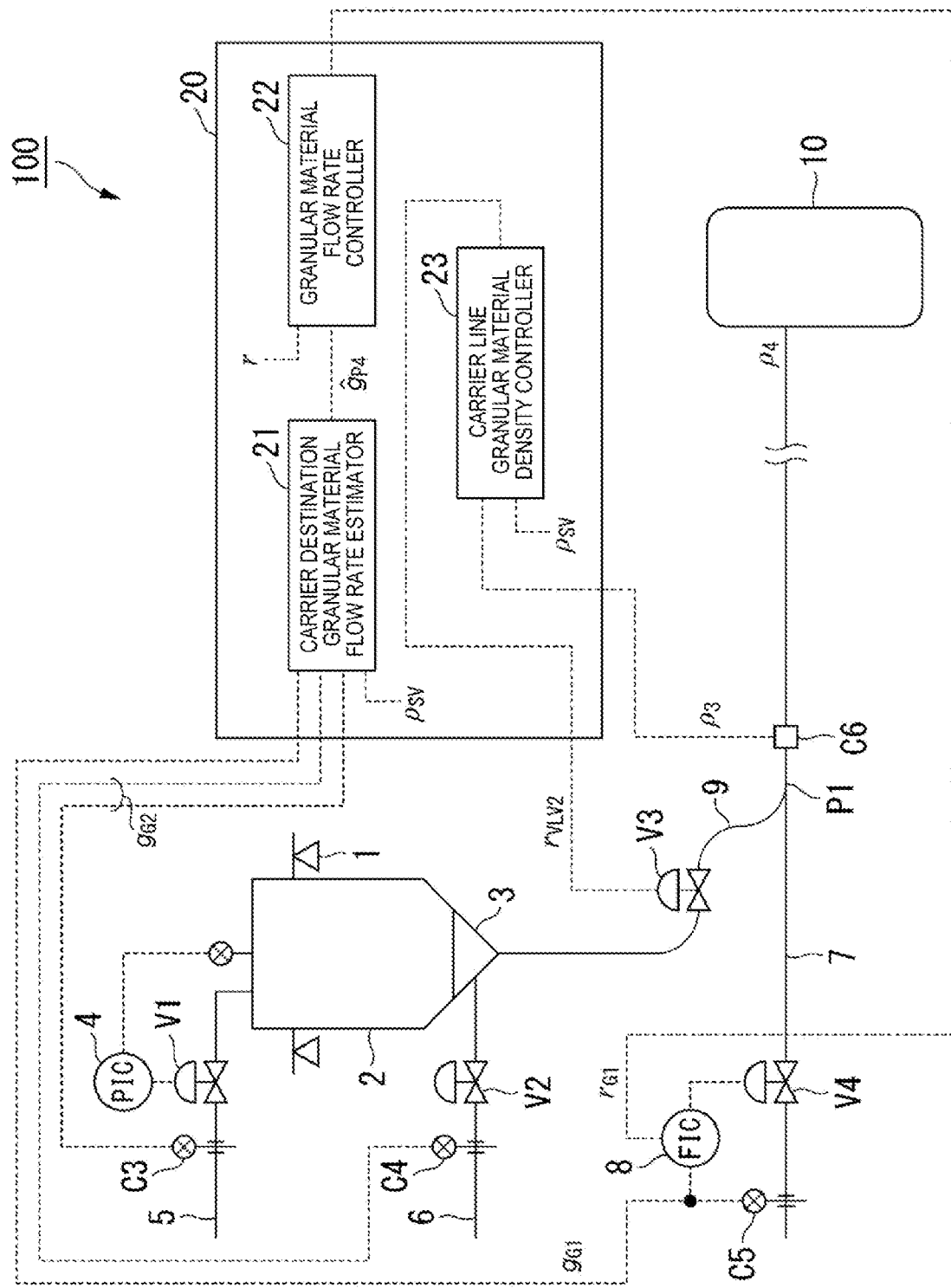
FIG. 1 is a view illustrating an example of a granular material supply system according to a first embodiment.

FIG. 1 is a view illustrating an example of a granular material supply system according to a first embodiment.

A granular material supply system 100 includes a blow tank 2, a pressurization line 5 connected to an upper portion of the blow tank 2, an aeration line 6 connected to an aerator 3, a cutout line 9 connected to a lower portion of the blow tank 2, a carrier line 7, and a control device 20. The pressurization line 5 is provided with a pressure control device PIC 4, a pressure regulation valve V1, and a flow rate sensor C3. The aeration line 6 is provided with a flow rate sensor C4 and an aeration gas flow rate control valve V2. The carrier line 7 is provided with a flow rate control device FIC 8, a carrier gas flow rate control valve V4, and a flow rate sensor C5, and a junction P1 of the carrier line 7 and a cutout line 9 (or downstream of P1) is provided with a density sensor C6. Each of the sensors C3 to C6 is connected to the control device 20.

The control device 20 includes a carrier destination granular material flow rate estimator 21, a granular material flow rate controller 22, and a carrier line granular material density controller 23.

The carrier destination granular material flow rate estimator 21 acquires a command value $\rho_{SV}$ of the granular material density to be supplied to the carrier destination facility 10 and measurement values of the flow rate sensors C3 to C5, and estimates the supply flow rate of the granular material to the carrier destination facility 10 by using Equation (5) below.

Equation 3

$$g_{P4}(t) \approx \rho_{SV} \cdot \left( \frac{g_{G1}(t) + g_{G2}(t)}{\rho_G} + \frac{g_{P2}(t)}{\rho_P} \right) \quad (5)$$

$\rho_{SV}$ is a set value (command value) of the granular material density. $g_{G1}(t)$ is the measurement value of the flow rate sensor C5. $g_{G2}(t)$ is a total of the measurement value of the flow rate sensor C3 and the measurement value of the flow rate sensor C4. The values of the density $\rho_G$ of the carrier gas component and the density pp of the granular material component are known values (fixed values determined by the type of granular material or the operation state of the granular material supply device). If the values of the carrier gas flow rate $g_{G1}$ (t)$_{and}$ the total flow rate $g_{G2}$ (t) of the aeration and the pressurized gas are known, considering that the granular material density $\rho_3$ at the junction P1 and the downstream side thereof is maintained at an expectation value $\rho_{SV}$ of the granular material density of the carrier line, the estimated value of the cutout flow rate $g_{P2}$ (t) can be expressed by Equation (6) below. Furthermore, from the above equation (5) and Equation (6) below, the estimated value of the supply flow rate of granular material to the carrier destination facility 10 at time t can be expressed by Equation (7) below.

Equation 4

$$\hat{g}_{P2}(t) = \frac{\rho_G^{-1} - \rho_{SV}^{-1}}{\rho_{SV}^{-1} - \rho_P^{-1}}(g_{G1}(t) + g_{G2}(t)) \tag{6}$$

Equation 5

$$\hat{g}_{P4}(t) = \rho_{SV} \cdot \left( \frac{g_{G1}(t) + g_{G2}(t)}{\rho_G} + \frac{\hat{g}_{P2}(t)}{\rho_P} \right) \tag{7}$$

The carrier destination granular material flow rate estimator 21 estimates the supply flow rate of granular material to the carrier destination facility 10 at the time t by using the equation (7).

The granular material flow rate controller 22 controls the flow rate of the carrier gas flowing through the carrier line 7. The flow rate of the granular material at the time t requested by the carrier facility 10 is assumed to be r (t) (kg/s). For example, the granular material flow rate controller 22 may use an estimated value g $\hat{}_{P4}$(t) of the supply flow rate of the granular material at the time t estimated by the carrier destination granular material flow rate estimator 21 to calculate the command value $r_{G1}$ of the carrier gas flow rate at the time t by proportional-integral control (PI control) as in Equation (8) below. $k_P$ is a symbol representing a proportional gain of the proportional-integral controller, and $T_I$ is a symbol representing an integral time constant of the proportional-integral controller.

Equation 6

$$r_{G1}(t) = k_P \left( r(t) - \hat{g}_{P4}(t) + \int \frac{r(t) - \hat{g}_{P4}(t)}{T_I} dt \right) \tag{8}$$

The granular material flow rate controller 22 outputs the command value $r_{G1}$ of the carrier gas flow rate calculated by the equation (8) to the flow rate control device FIC 8. This adjusts the opening degree of the carrier gas flow rate control valve V4 and achieves the carrier gas flow rate based on the requested r (t).

The carrier line granular material density controller 23 controls the cutout flow rate of the granular material to be supplied to the cutout line 9. For example, the carrier line granular material density controller 23 may calculate the opening degree command value $r_{VLV2}$ (t) of the cutout flow rate control valve V3 by proportional-integral control (PI control) as in Equation (9) below. $k_P$ is a common symbol representing a proportional gain, and $T_I$ is a common symbol representing an integral time constant. The proportional-integral controllers of the second and subsequent embodiments described later also use the symbols $k_P$ and $T_I$, but these values are different for each embodiment. The proportional-integral controller increases the opening degree of the cutout flow rate control valve V3 when the density $\rho_3$ (kg/m$^3$) at the junction measured by the density sensor C6 is less than the set value $\rho_{SV}$ and decreases the opening degree of the cutout flow rate control valve V3 when the density $\rho_3$ (kg/m$^3$) exceeds the set value $\rho_{SV}$, thus making the density $\rho_3$ (kg/m$^3$) at the junction coincide with the set value $\rho_{SV}$.

Equation 7

$$r_{VLV2}(t) = k_P \left( \rho_{SV}(t) - \rho_3(t) + \int \frac{\rho_{SV}(t) - \rho_3(t)}{T_I} dt \right) \tag{9}$$

The carrier line granular material density controller 23 males the granular material density at the junction constant even when the flow rate of the carrier gas is changed. For example, setting $\rho_{SV}$ as a command value in the carrier line granular material density controller 23 makes the time average value of the granular material density at the junction P1 constant at $\rho_{SV}$. If the granular material density at the junction P1 is constant even when the flow rate of the carrier gas is changed, the expectation value of the granular material density of the carrier line 7 becomes uniform at $\rho_{SV}$ in the downstream portion of the junction P1 regardless of the location. Then, as described above, since the volume flow rate U of the carrier gas propagates without delay even 100 m ahead, if the granular material density $\rho_{SV}$ can be controlled constantly, the actual granular material flow rate to be supplied to the carrier destination facility 10 without delay can be controlled to a desired value by controlling the carrier gas flow rate. Instead of the set value $\rho_{SV}$ of the granular material density, a time average value of the granular material density $\rho_3$ at the junction P1 may be used as an expectation value. A value obtained by smoothing $\rho_3$ with a high-pass cutoff filter such as a first-order delay may be used as an expectation value. When the expectation value of the granular material density of the carrier line 7 is determined by any method, the granular material supply flow rate to the carrier destination is expressed by the equation (5), and the granular material supply flow rate $g_{p4}$ (kg/s) to the carrier destination facility 10 is proportional to the carrier gas flow rate $g_{G1}$ (kg/s). As a result, by adjusting the carrier gas flow rate $g_{G1}$ (kg/s) to the command value r, the granular material flow rate to be supplied to the carrier destination facility 10 can be controlled to the command value without delay and without sparseness and denseness.

Operation

Next, the flow of granular material supply control by the control device 20 will be described with reference to FIGS. 2A and 2B. As a premise, the control device 20 stores set values of the command value $\rho_{SV}$ of the granular material density, the density $\rho_G$ of the carrier gas component, and the density $\rho_P$ of the granular material component. The control device 20 acquires measurement values of the flow rate sensors C3 to C5 and the density sensor C6 from moment to moment. The control device 20 acquires the command value r (t) of the latest flow rate requested by the carrier destination facility 10. The control device 20 repeatedly executes the processing illustrated in FIGS. 2A and 2B in parallel at a predetermined control cycle.

Figure 2A:
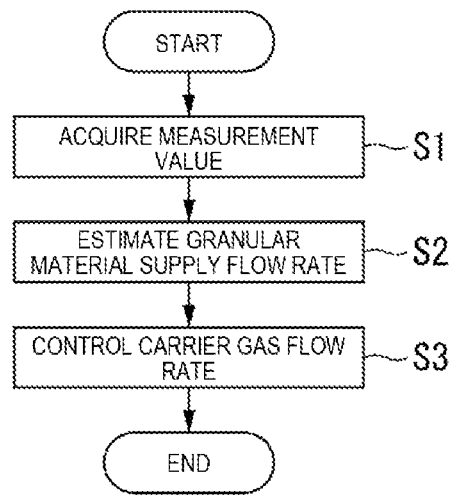
FIG. 2A is a flowchart illustrating an example of carrier gas flow rate control according to the first embodiment.

The flow of the flow rate control of carrier gas is shown in FIG. 2A. FIG. 2A is a flowchart illustrating an example of the carrier gas flow rate control according to the first embodiment. The carrier destination granular material flow rate estimator 21 acquires measurement values by the flow rate sensors C3 to C5 (step S1). Next, the carrier destination granular material flow rate estimator 21 estimates the supply flow rate of granular material to the carrier destination facility 10 by using the equation (7) (step S2). Next, the granular material flow rate controller 22 calculates the command value $r_{G1}$ of the carrier gas flow rate by using the flow rate command value r (t) requested by the carrier destination and the equation (8), and outputs the calculated command value $r_{G1}$ to the flow rate control device FIC 8, thus controlling the flow rate of the carrier gas (step S3).

Figure 2B:
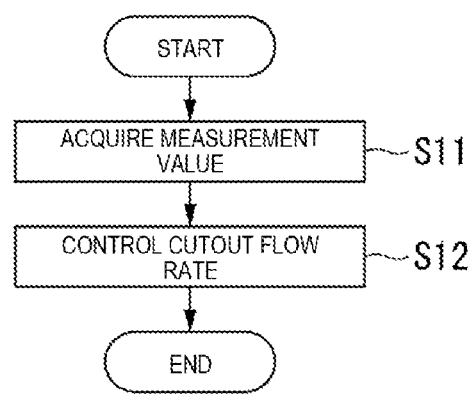
FIG. 2B is a flowchart illustrating an example of granular material density control according to the first embodiment.

FIG. 2B shows the flow of control for making the density of granular material at the junction P1 constant. FIG. 2B is a flowchart illustrating an example of the granular material density control according to the first embodiment. The carrier line granular material density controller 23 acquires a measurement value by the density sensor C6 (step S11). Next, the carrier line granular material density controller 23 calculates the opening degree command value $r_{VLV2}$ of the cutout flow rate control valve V3 by using the equation (9). The carrier line granular material density controller 23 controls the opening degree of the cutout flow rate control valve V3 by the calculated opening degree command value $r_{VLV2}$, and controls the density $\rho_3$ of the granular material at the junction P1 to become the set value $\rho_{SV}$ (step S12).

According to the present embodiment, the granular material supply system 100 that supplies granular material from the blow tank 2 to the carrier destination facility 10, while adjusting the opening degree of the cutout flow rate control valve V3 so that the density of granular material inside the carrier line 7 coincides with the set value $\rho_{SV}$ based on the density $\rho_3$ instructed by the density sensor C6 that measures the density of granular material in the carrier line 7, adjusts the opening degree of the carrier gas flow rate control valve V4 so that the carrier gas flow rate coincides with the command value r based on the command value r of the gas flow rate in the carrier line 7 and the expectation value ($\rho_{SV}$) of the granular material density in the carrier line 7. This can supply granular material to the carrier destination facility 10 at a flow rate as instructed.

Second Embodiment

Hereinafter, a granular material supply system 100A according to the second embodiment of the disclosure will be described with reference to FIGS. 3, 4A, and 4B. In the first embodiment, the opening degree of the cutout flow rate control valve V3 is controlled for density control of the granular material at the junction P1, and the opening degree of the carrier gas flow rate control valve V4 is controlled for flow rate control of the carrier gas. On the other hand, in the second embodiment, the opening degree of the aeration gas flow rate control valve V2 is controlled for density control of the granular material at the junction P1, and the opening degree of the cutout flow rate control valve V3 is controlled for flow rate control of the carrier gas. Among the granular material supply facilities, there is a facility in which the flow rate of the carrier gas passing through the carrier gas flow rate control valve V4 is zero or close to zero, and granular material is carried to the carrier destination facility 10 by the pressurized gas or the aeration gas flowing out from the blow tank 2. The supply control of granular material according to the second embodiment is suitable for facilities having such properties.

Configuration

Figure 3:
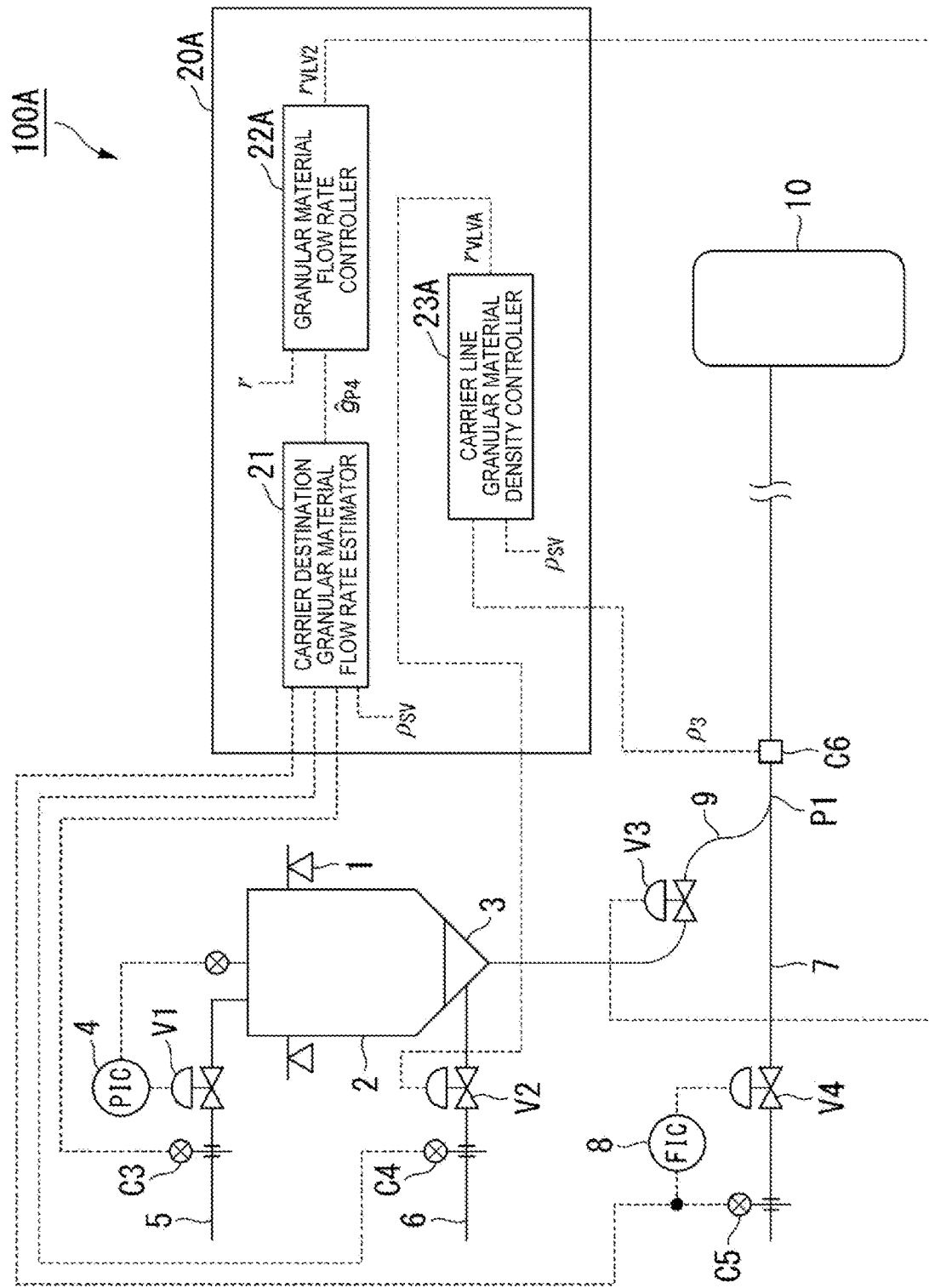
FIG. 3 is a view illustrating an example of a granular material supply system according to a second embodiment.

FIG. 3 is a view illustrating an example of a granular material supply system according to a second embodiment.

In the configuration according to the second embodiment, the same components as those of the granular material supply system 100 according to the first embodiment are denoted by the same reference numerals, and the description thereof will be omitted. Also in the second embodiment, as in the first embodiment, the granular material density at the junction P1 is controlled to become constant even when the flow rate of the carrier gas is changed. The difference from the first embodiment lies in that density control is performed by changing the flow rate of the aeration gas flowing through the aeration line 6. Depending on the type of granular material and the type of the aerator 3, the aeration gas flow rate and the pressurized gas flow rate may be larger than the carrier gas flow rate. In extreme cases, the carrier gas flow rate may be zero depending on operating conditions such as output. When the carrier gas is zero, the cutout flow rate $g_{P2}$ passing through the cutout flow rate control valve V3 is not diluted with the carrier gas flow rate $g_{G1}$, and thus even if the cutout flow rate control valve V3 is opened, the granular material density $\rho_3$ at the junction P1 does not decrease. In such a case, it is necessary to adjust the ratio between the gas flowing out of the blow tank 2 and the granular material. The second embodiment is a technique for that. As a general property of cutting out granular material from the blow tank 2, when the aeration gas flow rate is increased, the density of the granular material in the mixture including the cut out granular material and the gas decreases. This is because the increase in the aeration flow rate increases the amount of gas in the vicinity of the extraction port for extracting granular material from the blow tank 2, and the granular material becomes sparse. Thus, if the granular material density $\rho_3$ at the junction P1 is insufficient, the aeration gas flow rate control valve V2 is further closed from the current opening degree to reduce the aeration gas, whereby the granular material in the mixture cut out from the blow tank 2 becomes dense, and the insufficiency of the granular material density at the junction P1 is compensated. Conversely, if $\rho_3$ at the junction P1 is excessive, the density excess can be compensated by further opening the aeration gas flow rate control valve V2 from the current opening degree. In this manner, the density of the granular material at the junction P1 can be made constant.

The granular material supply system 100A according to the second embodiment includes a control device 20A instead of the control device 20 of the first embodiment, and the control device 20A includes the carrier destination granular material flow rate estimator 21, a granular material flow rate controller 22A, and a carrier line granular material density controller 23A. The carrier destination granular material flow rate estimator 21 is similar to that of the first embodiment.

The granular material flow rate controller 22A controls the opening degree of the cutout flow rate control valve V3. The flow rate of granular material required by the carrier facility 10 is assumed to be r (t) (kg/s). For example, using the estimated value $\hat{g}_{P4}$ (t) of the supply flow rate of granular material estimated by the carrier destination granular material flow rate estimator 21, the granular material flow rate controller 22A may calculate the command value $r_{VLV2}$ of the opening degree of the cutout flow rate control valve V3 by proportional-integral control (PI control) as in Equa tion (10) below. $k_P$ is a proportional gain, and $T_I$ is an integral time constant.

Equation 8

$$r_{VLV2}(t) = k_P\left(r(t) - \hat{g}_{P4}(t) + \int \frac{r(t) - \hat{g}_{P4}(t)}{T_I} dt\right) \quad (10)$$

The granular material flow rate controller 22A controls the opening degree of the cutout flow rate control valve V3 by the opening degree command value $r_{VLV2}(t)$ at the time t calculated by using the equation (10). This achieves a gas flow rate based on the requested r (t).

The carrier line granular material density controller 23A controls the opening degree of the aeration gas flow rate control valve V2. For example, the carrier line granular material density controller 23A may calculate the opening degree command value $r_{VLVA}$ (t) of the aeration gas flow rate control valve V2 at the time (t) by proportional-integral control (PI control) as in Equation (11) below. $k_P$ is a proportional gain, and $T_I$ is an integral time constant. The proportional-integral controller of the equation (11) decreases the opening degree of the aeration gas flow rate control valve V2 when the density $\rho_3$ at the junction measured by the density sensor C6 is less than the set value $\rho_{SV}$ and increases the opening degree of the aeration gas flow rate control valve V2 when the density $\rho_3$ exceeds the set value $\rho_{SV}$, thus making the density $\rho_3$ at the junction coincide with the set value $\rho_{SV}$. When the aeration gas flow rate is increased, the granular material flowing out of the blow tank 2 is diluted, and thus the proportional gain is denoted by a minus sign so that the flow rate of the aeration gas increases when the granular material density $\rho_3$ exceeds the set value $\rho_{SV}$.

Equation 9

$$r_{VLVA}(t) = -k_P\left(\rho_{SV}(t) - \rho_3(t) + \int \frac{\rho_{SV}(t) - \rho_3(t)}{T_I} dt\right) \quad (11)$$

Operation

The operation of the control device 20A according to the second embodiment will be described with reference to FIGS. 4A and 4B. The control device 20A repeatedly executes the processing illustrated in FIGS. 4A and 4B in parallel at a predetermined control cycle. The preconditions are the same as those of the first embodiment.

Figure 4A:
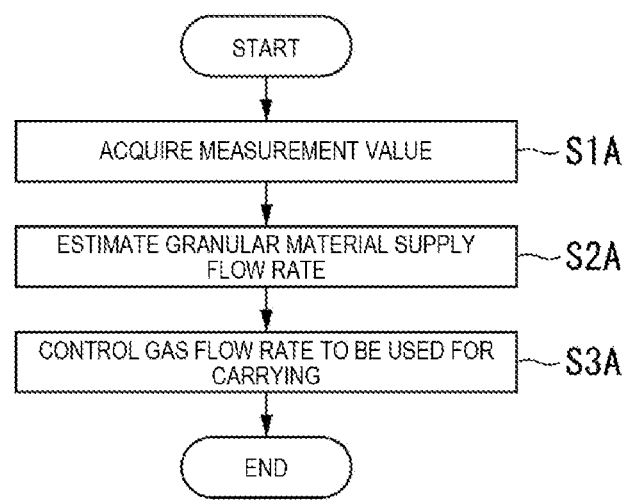
FIG. 4A is a flowchart illustrating an example of gas flow rate control according to the second embodiment.

The flow rate control of the gas flowing out of the blow tank 2 is shown in FIG. 4A. FIG. 4A is a flowchart illustrating an example of the gas flow rate control according to the second embodiment. The carrier destination granular material flow rate estimator 21 acquires measurement values by the flow rate sensors C3 to C5 (step S1A). Next, the carrier destination granular material flow rate estimator 21 estimates the supply flow rate of granular material to the carrier destination facility 10 by using the equation (7) (step S2A). Next, the granular material flow rate controller 22A calculates the opening degree command value $r_{VLV2}$ (t) by the flow rate command value r (t) requested by the carrier destination and the equation (10), and controls the opening degree of the cutout flow rate control valve V3, thus controlling the flow rate of the gas (gas flowing out of the blow tank 2) to be used for carrying of the granular material (step S3A).

Figure 4B:
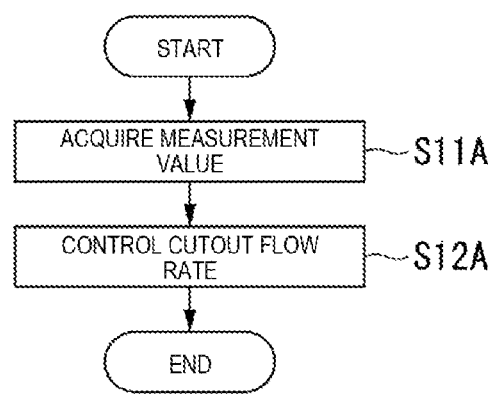
FIG. 4B is a flowchart illustrating an example of granular material density control according to the second embodiment.

FIG. 4B shows the flow of control for making the density of granular material at the junction P1 constant. FIG. 4B is a flowchart illustrating an example of the granular material density control according to the second embodiment. The carrier line granular material density controller 23A acquires a measurement value by the density sensor C6 (step S11A). Next, the carrier line granular material density controller 23A calculates the opening degree command value $r_{VLVA}$ of the aeration gas flow rate control valve V2 by using the equation (11). The carrier line granular material density controller 23A controls the opening degree of the aeration gas flow rate control valve V2 by the calculated opening degree command value $r_{VLVA}$, and controls the density $\rho_3$ of the granular material at the junction P1 to the set value $\rho_{SV}$ (step S12A).

According to the present embodiment, the granular material supply system 100A that supplies granular material from the blow tank 2 to the carrier destination facility 10, while adjusting the opening degree of the aeration gas flow rate control valve V2 so that the density of granular material inside the carrier line coincides with the set value $\rho_{SV}$ based on the density $\rho_3$ instructed by the density sensor C6 that measures the density of granular material in the carrier line 7, adjusts the opening degree of the cutout flow rate control valve V3 so that the gas flow rate of the carrier line coincides with the command value r based on the command value r of the gas flow rate in the carrier line 7 and the expectation value ($\rho_{SV}$) of the granular material density in the carrier line 7. This can supply granular material to the carrier destination facility 10 at a flow rate as instructed.

Third Embodiment

Hereinafter, a granular material supply system 100B according to a third embodiment of the disclosure will be described with reference to FIG. 5. In the third embodiment, the flow rate $\hat{g}_{P4}$ of granular material is estimated using the flow velocity of the carrier gas downstream of the junction P1.

Configuration

Figure 5:
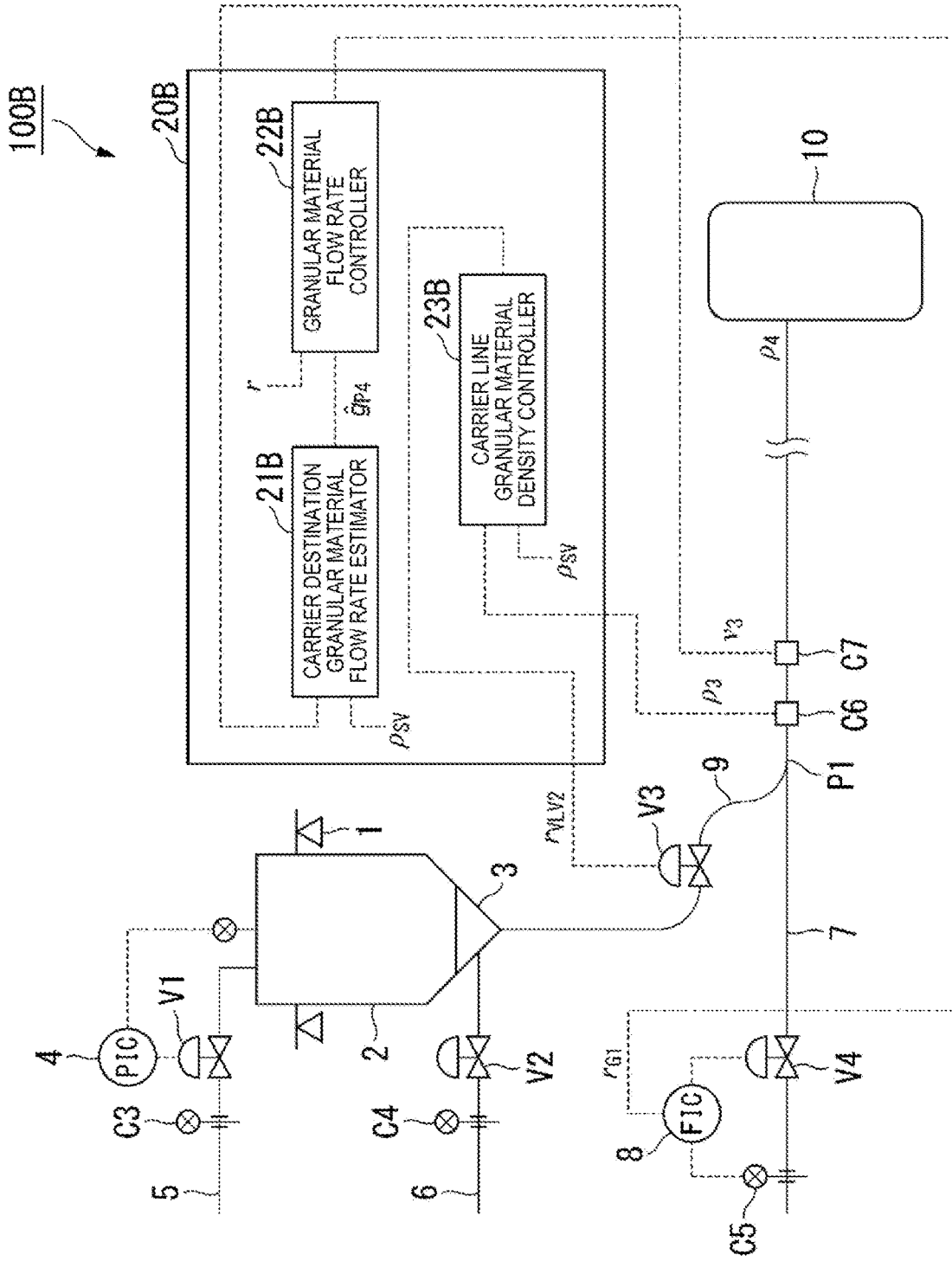
FIG. 5 is a view illustrating an example of a granular material supply system according to a third embodiment.

FIG. 5 is a view illustrating an example of the granular material supply system according to the third embodiment.

In the configuration according to the third embodiment, the same components as those of the granular material supply system 100 according to the first embodiment are denoted by the same reference numerals, and the description thereof will be omitted. Also in the third embodiment, as in the first embodiment, the granular material density at the junction P1 is controlled to become constant even when the flow rate of the carrier gas is changed. The granular material supply system 100B according to the third embodiment includes a flow velocity sensor C7 that measures the flow velocity of the carrier gas downstream of the junction P1. In the third embodiment, the illustrated flow rate sensors C3 to C5 are not essential. The granular material supply system 100B according to the third embodiment includes a control device 20B instead of the control device 20 of the first embodiment, and the control device 20B includes a carrier destination granular material flow rate estimator 21B, a granular material flow rate controller 22B, and a carrier line granular material density controller 23B.

The carrier destination granular material flow rate estimator 21B estimates the granular material supply flow rate $\hat{g}_{P4}(t)$ to the carrier destination facility 10 using Equation (12) below and the flow velocity of the granular material at the junction P1 measured by the flow velocity sensor C7. When the flow velocity of the granular material at the junction P1 is $v_3$ (m/s) and the cross-sectional area of the carrier line 7 is $A_3$ (m²), the granular material supply flow rate to the carrier destination is expressed by Equation (12) below.

Equation 10

$$\hat{g}_{P4}(t) = \rho_{SV} A_3 v_3 \quad (12)$$

As compared with the first embodiment, since the flow velocity of the granular material in the carrier line 7 is directly measured, the calculation is simple and the calculation load can be reduced.

The granular material flow rate controller 22B controls the flow rate of the carrier gas flowing through the carrier line 7. The flow rate of granular material required by the carrier facility 10 is assumed to be r (t) (kg/s). For example, using the estimated value of the supply flow rate of the granular material estimated by the carrier destination granular material flow rate estimator 21B, the granular material flow rate controller 22B may calculate the command value $r_{G1}$ of the carrier gas flow rate by proportional-integral control (PI control) as in Equation (13) below. $k_P$ is a proportional gain, and $T_I$ is an integral time constant.

Equation 11

$$r_{G1}(t) = k_P \left( r(t) - \hat{g}_{P4}(t) + \int \frac{r(t) - \hat{g}_{P4}(t)}{T_I} dt \right) \quad (13)$$

The carrier line granular material density controller 23B controls the cutout flow rate of the granular material to be supplied to the cutout line 9. For example, the carrier line granular material density controller 23B may calculate the opening degree command value $r_{VLV2}$ of the cutout flow rate control valve V3 by proportional-integral control (PI control) as in Equation (14) below. $k_P$ is a symbol representing a proportional gain, and $T_I$ is a symbol representing an integral time constant.

Equation 12

$$r_{VLV2}(t) = k_P \left( \rho_{SV}(t) - \rho_3(t) + \int \frac{\rho_{SV}(t) - \rho_3(t)}{T_I} dt \right) \quad (14)$$

Operation

Next, the flow of granular material supply control by the control device 20B of the third embodiment will be described with reference to FIGS. 2A and 2B. The control device 20B repeatedly executes the processing illustrated in FIGS. 2A and 2B in parallel at a predetermined control cycle. The control device 20B stores the value $A_3$ (m²) of the cross-sectional area of the carrier line 7.

The flow of the flow rate control of carrier gas is shown in FIG. 2B. The carrier destination granular material flow rate estimator 21B acquires the measurement value (speed v3) measured by the flow velocity sensor C7 (step S1). Next, the carrier destination granular material flow rate estimator 21B estimates the supply flow rate of granular material to the carrier destination facility 10 by using the equation (12) (step S2). Next, the granular material flow rate controller 22B calculates the command value $r_{G1}$ (t) of the carrier gas flow rate at the time t by the flow rate command value r (t) at the time t requested by the carrier destination and the equation (13), and outputs it to the flow rate control device FIC 8, thus controlling the flow rate of the carrier gas (step S3).

FIG. 2B shows the flow of control for making the density of granular material at the junction P1 constant. The carrier line granular material density controller 23B acquires a measurement value by the density sensor C6 (step S11). Next, the carrier line granular material density controller 23B calculates the opening degree command value $r_{VLV2}$ of the cutout flow rate control valve V3 at the time t by using the equation (14). The carrier line granular material density controller 23B controls the opening degree of the cutout flow rate control valve V3 by the calculated opening degree command value $r_{VLV2}$, and controls the density $\rho_3$ of the granular material at the junction P1 to the set value $\rho_{SV}$ (step S12).

According to the present embodiment, the granular material supply system 100B that supplies granular material from the blow tank 2 to the carrier destination facility 10, while adjusting the opening degree of the cutout flow rate control valve V3 so that the density of granular material inside the carrier line coincides with the set value $\rho_{SV}$ based on the density $\rho_3$ instructed by the density sensor C6 that measures the density of granular material in the carrier line 7, adjusts the opening degree of the carrier gas flow rate control valve V4 so that the carrier gas flow rate coincides with the command value r based on the granular material velocity in the carrier line 7 instructed by the flow velocity sensor C7 and the expectation value ($\rho_{SV}$) of the granular material density in the carrier line 7. This can supply granular material to the carrier destination facility 10 at a flow rate as instructed.

Fourth Embodiment

Hereinafter, a granular material supply system 100C according to a fourth embodiment of the disclosure will be described with reference to FIG. 6. In the fourth embodiment, in the configuration of the second embodiment, as in the third embodiment, the flow rate $\hat{g}_{P4}$ of granular material is estimated using the flow velocity of the carrier gas downstream of the junction P1.

Configuration

Figure 6:
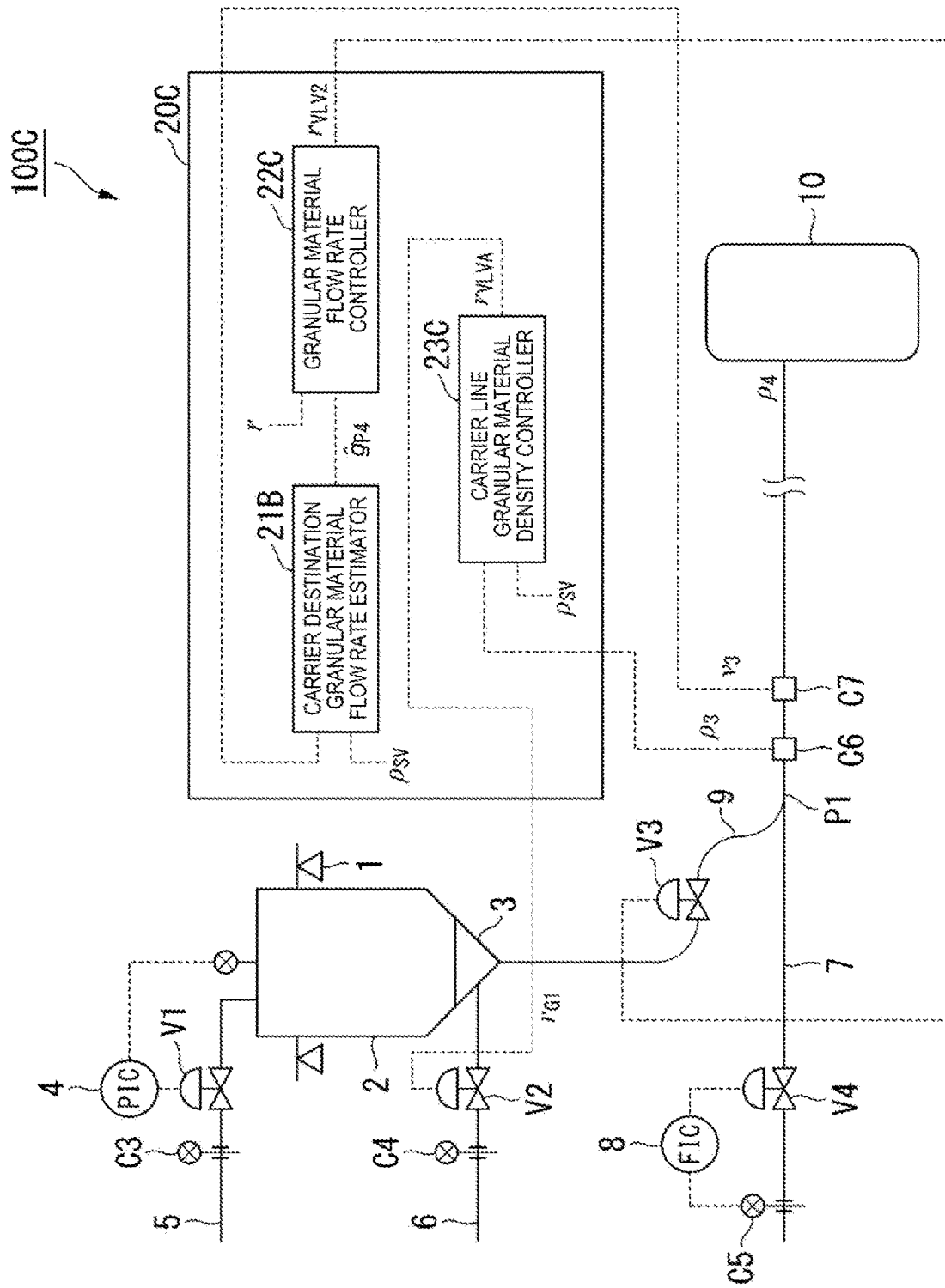
FIG. 6 is a view illustrating an example of a granular material supply system according to a fourth embodiment.

FIG. 6 is a view illustrating an example of the granular material supply system according to the fourth embodiment.

In the configuration according to the fourth embodiment, the same components as those of the granular material supply systems 100A and 100B according to the second embodiment and the third embodiment are denoted by the same reference numerals, and the description thereof will be omitted. The granular material supply system 100C according to the fourth embodiment includes the flow velocity sensor C7 that measures the flow rate of the carrier gas downstream of the junction P1. In the fourth embodiment, the illustrated flow rate sensors C3 to C5 are not essential. The granular material supply system 100C according to the fourth embodiment includes a control device 20C instead of the control device 20A of the second embodiment, and the control device 20C includes the carrier destination granular material flow rate estimator 21B, a granular material flow rate controller 22C, and a carrier line granular material density controller 23C. The carrier destination granular material flow rate estimator 21B is similar to that of the third embodiment. As compared with the carrier destination granular material flow rate estimator 21 of the second embodiment, since the flow velocity of the granular material in the carrier line 7 is directly measured, the calculation is simple.

The granular material flow rate controller 22C controls the opening degree of the cutout flow rate control valve V3.

The flow rate of granular material required by the carrier facility 10 is assumed to be r (t) (kg/s). For example, using the estimated value of the supply flow rate of granular material estimated by the carrier destination granular material flow rate estimator 21B, the granular material flow rate controller 22C may calculate the command value $r_{VLV2}$ (t) of the opening degree of the cutout flow rate control valve V3 at the time t by proportional-integral control (PI control) as in Equation (15) below. $k_P$ is a proportional gain, and $T_I$ is an integral time constant.

Equation 13

$$r_{VLV2}(t) = k_P\left(r(t) - \hat{g}_{P4}(t) + \int \frac{r(t) - \hat{g}_{P4}(t)}{T_I}dt\right) \quad (15)$$

The carrier line granular material density controller 23C controls the opening degree of the aeration gas flow rate control valve V2. For example, the carrier line granular material density controller 23C may calculate the opening degree command value $r_{VLVA}$ (t) of the aeration gas flow rate control valve V2 at the time t by proportional-integral control (PI control) as in Equation (16) below. $k_P$ is a symbol representing a proportional gain, and $T_I$ is a symbol representing an integral time constant.

Equation 14

$$r_{VLVA}(t) = -k_P\left(\rho_{SV}(t) - \rho_3(t) + \int \frac{\rho_{SV}(t) - \rho_3(t)}{T_I}dt\right) \quad (16)$$

Operation

Next, the flow of granular material supply control by the control device 20C of the fourth embodiment will be described with reference to FIGS. 4A and 4B. The control device 20C repeatedly executes the processing illustrated in FIGS. 4A and 4B in parallel at a predetermined control cycle. The control device 20C stores the value $A_3$ (m²) of the cross-sectional area of the carrier line 7.

The flow rate control of the gas flowing out of the blow tank 2 is shown in FIG. 4A. The carrier destination granular material flow rate estimator 21B acquires the measurement value (speed $V_3$) measured by the flow velocity sensor C7 (step S1A). Next, the carrier destination granular material flow rate estimator 21B estimates the supply flow rate of granular material to the carrier destination facility 10 by using the equation (12) (step S2A). Next, the granular material flow rate controller 22C calculates the opening degree command value $r_{VLV2}$ (t) by the flow rate command value r (t) requested by the carrier destination and the equation (15), and controls the opening degree of the cutout flow rate control valve V3. This controls the flow rate of the gas (gas flowing out of the blow tank 2) to be used for carrying of the granular material to b e a value based on the command value r (t) (step S3A).

FIG. 4B shows the flow of control for making the density of granular material at the junction P1 constant. The carrier line granular material density controller 23C acquires the measurement value by the density sensor C6 (step S11A). Next, the carrier line granular material density controller 23C calculates the opening degree command value $r_{VLVA}$ (t) of the aeration gas flow rate control valve V2 at the time t by using the equation (16). The carrier line granular material density controller 23C controls the opening degree of the aeration gas flow rate control valve V2 by the calculated opening degree command value $r_{VLVA}$ (t), and controls the density $\rho_3$ of the granular material at the junction P1 to become the set value $\rho_{SV}$ (step S12A).

According to the present embodiment, the granular material supply system 100C that supplies granular material from the blow tank 2 to the carrier destination facility 10, while adjusting the opening degree of the opening degree of the aeration gas flow rate control valve V2 so that the density of granular material inside the carrier line 7 coincides with the set value $\rho_{SV}$ based on the density $\rho_3$ instructed by the density sensor C6 that measures the density of granular material in the carrier line 7, adjusts the opening degree of the cutout flow rate control valve V3 so that the carrier gas flow rate coincides with the command value r based on the granular material speed in the carrier line 7 instructed by the flow velocity sensor C7 and the expectation value of the granular material density in the carrier line 7. This can supply granular material to the carrier destination facility 10 at a flow rate as instructed.

Fifth Embodiment

Hereinafter, a granular material supply system 100D according to a fifth embodiment of the disclosure will be described with reference to FIG. 7. In the fifth embodiment, the flow rate $\hat{g}_{P4}$ (t) of the granular material is estimated using the density and the flow velocity of the granular material flowing out of the blow tank 2.

Configuration

Figure 7:
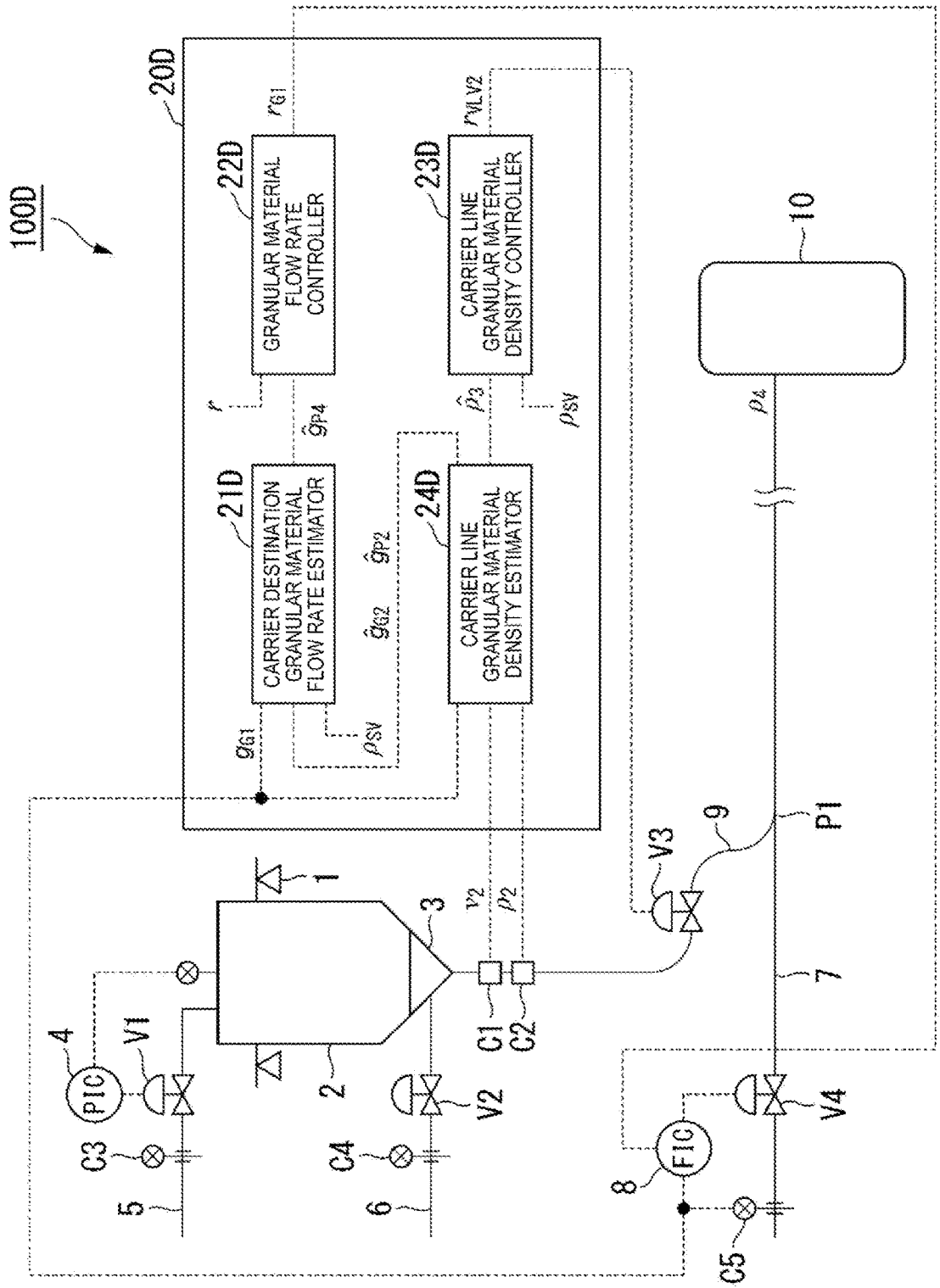
FIG. 7 is a view illustrating an example of a granular material supply system according to a fifth embodiment.

FIG. 7 is a view illustrating an example of the granular material supply system according to the fifth embodiment.

In the configuration according to the fifth embodiment, the same components as those of the granular material supply systems according to the first embodiment and the third embodiment are denoted by the same reference numerals, and the description thereof will be omitted. The granular material supply system 100D according to the fifth embodiment includes the flow velocity sensor C1 and the density sensor C2 downstream of the blow tank 2. Hereinafter, the value measured by the density sensor C2 is considered as the density of granular material. It is considered that the gas and the granular material flow at the speed measured by the flow velocity sensor C1. In the fifth embodiment, the illustrated flow rate sensors C3 and C4 are not essential. The granular material supply system 100D according to the fifth embodiment includes a control device 20D instead of the control device 20 of the first embodiment, and the control device 20D includes a carrier destination granular material flow rate estimator 21D, a granular material flow rate controller 22D, a carrier line granular material density controller 23D, and a carrier line granular material density estimator 24D.

The carrier line granular material density estimator 24D estimates the granular material density $\rho_3$ at the junction P1. When the cross-sectional area of the cutout line 9 is expressed by $A_2$ (m²) and it is approximated that the gas and the granular material flow at a constant speed, the flow rate of the granular material in the cutout line 9 at time t when the flow velocity of the granular material in the cutout line 9 measured by the flow sensor C1 is $v_2$ (m/s) and the density of the granular material measured by the density sensor C2 is $\rho_2$ (kg/m³) can be calculated by Equation (17) below.

Equation 15

$$\hat{g}_{P2}(t) = \rho_2 A_2 v_2 \quad (17)$$

Similarly, the gas flow rate (flow rate of the gas flowing out of the blow tank 2) of the cutout line 9 at the time t can be calculated by Equation (18) below using the flow velocity $v_2$ (m/s) of the granular material measured by the flow velocity sensor C1 and the set value $\rho_G$ of the gas density.

Equation 16

$$\hat{g}_{G2}(t) = \rho_G A_2 v_2 \quad (18)$$

Using the measurement values obtained by the sensors C1 and C2 and the equations (17) and (18), the carrier line granular material density estimator 24D calculates the flow rate of granular material and the gas flow rate in the cutout line 9, and further estimates the density $\hat{\rho}_3$ (t) at the junction P1 by the flow rate $g_{G1}$ of the carrier gas measured by the flow rate sensor C5 and Equation (19) below.

Equation 17

$$\hat{\rho}_3(t) = \frac{\hat{g}_{P2}(t)}{(g_{G1}(t) + \hat{g}_{G2}(t))\rho_G^{-1} + \hat{g}_{P2}(t)\rho_P^{-1}} \quad (19)$$

As compared with the first embodiment and the third embodiment, since the granular material density of the cutout line 9 close to the blow tank 2 is measured, it is possible to quickly detect the fluctuation in the granular material density with respect to a change in the opening degree of the aeration line 6 and accurately estimate the granular material density $\hat{\rho}_3$ (t).

The carrier destination granular material flow rate estimator 21D estimates the granular material supply flow rate $\hat{g}_{P4}$ (t) to the carrier destination facility 10 by the estimated value $\hat{g}_{P2}$ of the flow rate of the granular material and the estimated value $\hat{g}_{G2}$ of the gas flow rate estimated by the carrier line granular material density estimator 24D, and Equation (20) below.

Equation 18

$$\hat{g}_{P4}(t) = \rho_{SV}/((g_{G1}(t) + \hat{g}_{G2}(t))\rho_G^{-1} + \hat{g}_{P2}(t)\rho_P^{-1}) \quad (20)$$

The granular material flow rate controller 22D controls the flow rate of the carrier gas flowing through the carrier line 7. The flow rate of granular material required by the carrier facility 10 is assumed to be r (t) (kg/s). For example, using the estimated value $\hat{g}_{P4}$ (t) of the granular material supply flow rate estimated by the carrier destination granular material flow rate estimator 21D, the granular material flow rate controller 22D may calculate the command value $r_{G1}$ (t) of the carrier gas flow rate at the time t by proportional-integral control (PI control) as in Equation (21) below. $k_P$ is a proportional gain, and $T_I$ is an integral time constant.

Equation 19

$$r_{G1}(t) = k_P\left(r(t) - \hat{g}_{P4}(t) + \int \frac{r(t) - \hat{g}_{P4}(t)}{T_I} dt\right) \quad (21)$$

The carrier line granular material density controller 23D controls the cutout flow rate of the granular material to be supplied to the cutout line 9. For example, using the granular material density $\hat{\rho}_3$ (t) estimated by the carrier line granular material density estimator 24D, the carrier line granular material density controller 23D may calculate the opening degree command value $r_{VLV2}$ (t) of the cutout flow rate control valve V3 at the time t by proportional-integral control (PI control) as in Equation (22) below. $k_P$ is a symbol representing a proportional gain, and $T_I$ is a symbol representing an integral time constant.

Equation 20

$$r_{VLV2}(t) = k_P\left(\rho_{SV}(t) - \rho_3(t) + \int \frac{\rho_{SV}(t) - \rho_3(t)}{T_I} dt\right) \quad (22)$$

Operation

Next, the flow of granular material supply control by the control device 20D of the fifth embodiment will be described with reference to FIGS. 8A and 8B. The control device 20D repeatedly executes the processing illustrated in FIGS. 8A and 8B in parallel at a predetermined control cycle. The control device 20D stores the value $A_2$ (m$^2$) of the cross-sectional area of the cutout line 9.

Figure 8A:
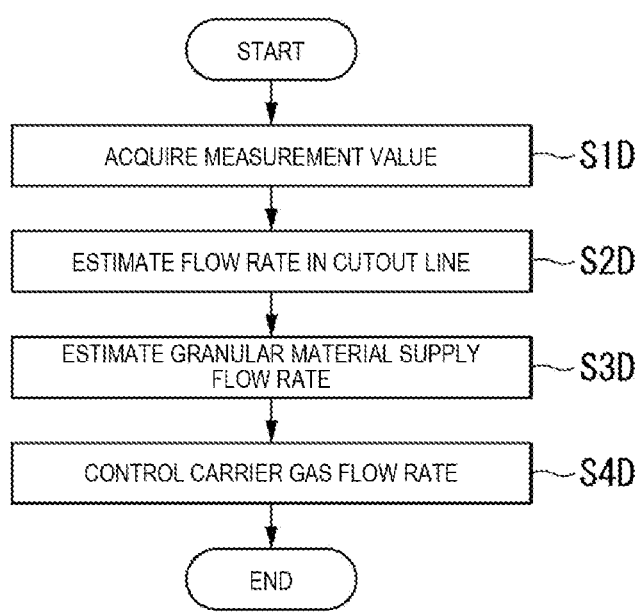
FIG. 8A is a flowchart illustrating an example of carrier gas flow rate control according to the fifth embodiment.

The flow of the flow rate control of carrier gas is shown in FIG. 8A. The carrier line granular material density estimator 24D acquires measurement values measured by the flow velocity sensor C1, the flow rate sensor C5, and the density sensor C2 (step S1D). Next, the carrier line granular material density estimator 24D estimates the flow rate $\hat{g}_{P2}$ of granular material and the gas flow rate $\hat{g}_{G2}$ in the cutout line 9 by using the equations (17) and (18) (step S2D).

Next, the carrier destination granular material flow rate estimator 21D estimates the supply flow rate $\hat{g}_{P4}$ (t) of granular material by using the equation (20) (step S3D). Next, the granular material flow rate controller 22D calculates the command value $r_{G1}$ (t) of the carrier gas flow rate by the flow rate command value r (t) requested by the carrier destination and the equation (21), and outputs it to the flow rate control device FIC 8, thus controlling the flow rate of the carrier gas (step S4).

Figure 8B:
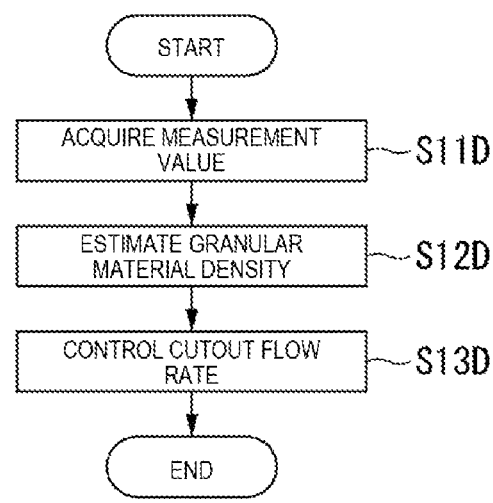
FIG. 8B is a flowchart illustrating an example of granular material density control according to the fifth embodiment.

FIG. 8B shows the flow of control for making the density of granular material at the junction P1 constant. The carrier line granular material density estimator 24D acquires measurement values measured by the flow velocity sensor C1, the flow rate sensor C5, and the density sensor C2 (step S11D). Next, the carrier line granular material density estimator 24D estimates the density of the granular material at the junction P1 by using the equation (19) (step S12D). Next, the carrier line granular material density controller 23D calculates the opening degree command value $r_{VLV2}$ of the cutout flow rate control valve V3 by using the equation (22). The carrier line granular material density controller 23D controls the opening degree of the cutout flow rate control valve V3 by the calculated opening degree command value $r_{VLV2}$, and controls the density $\rho_3$ of the granular material at the junction P1 to the set value $\rho_{SV}$.

According to the present embodiment, the granular material supply system 100D that supplies granular material from the blow tank 2 to the carrier destination facility 10, while adjusting the opening degree of the cutout flow rate control valve V3 so that the density of granular material inside the carrier line coincides with the set value $\rho_{SV}$ based on the estimated value $\hat{\rho}_3$ of the granular material density estimated based on the granular material density and the granular material velocity in the cutout line 9, and adjusts the opening degree of the carrier gas flow rate control valve V4 so that the carrier gas flow rate coincides with the command value r based on the granular material density and the granular material velocity in the cutout line 9 and the expectation value of the granular material density in the carrier line 7. This can supply granular material to the carrier destination facility 10 at a flow rate as instructed.

Sixth Embodiment

Hereinafter, a granular material supply system 100E according to a sixth embodiment of the disclosure will be described with reference to FIG. 9. In the sixth embodiment, similarly to the fifth embodiment, the flow rate $\hat{g}_{P4}$ (t) of the granular material is estimated using the density and the flow velocity of the granular material flowing out of the blow tank 2.

Configuration

Figure 9:
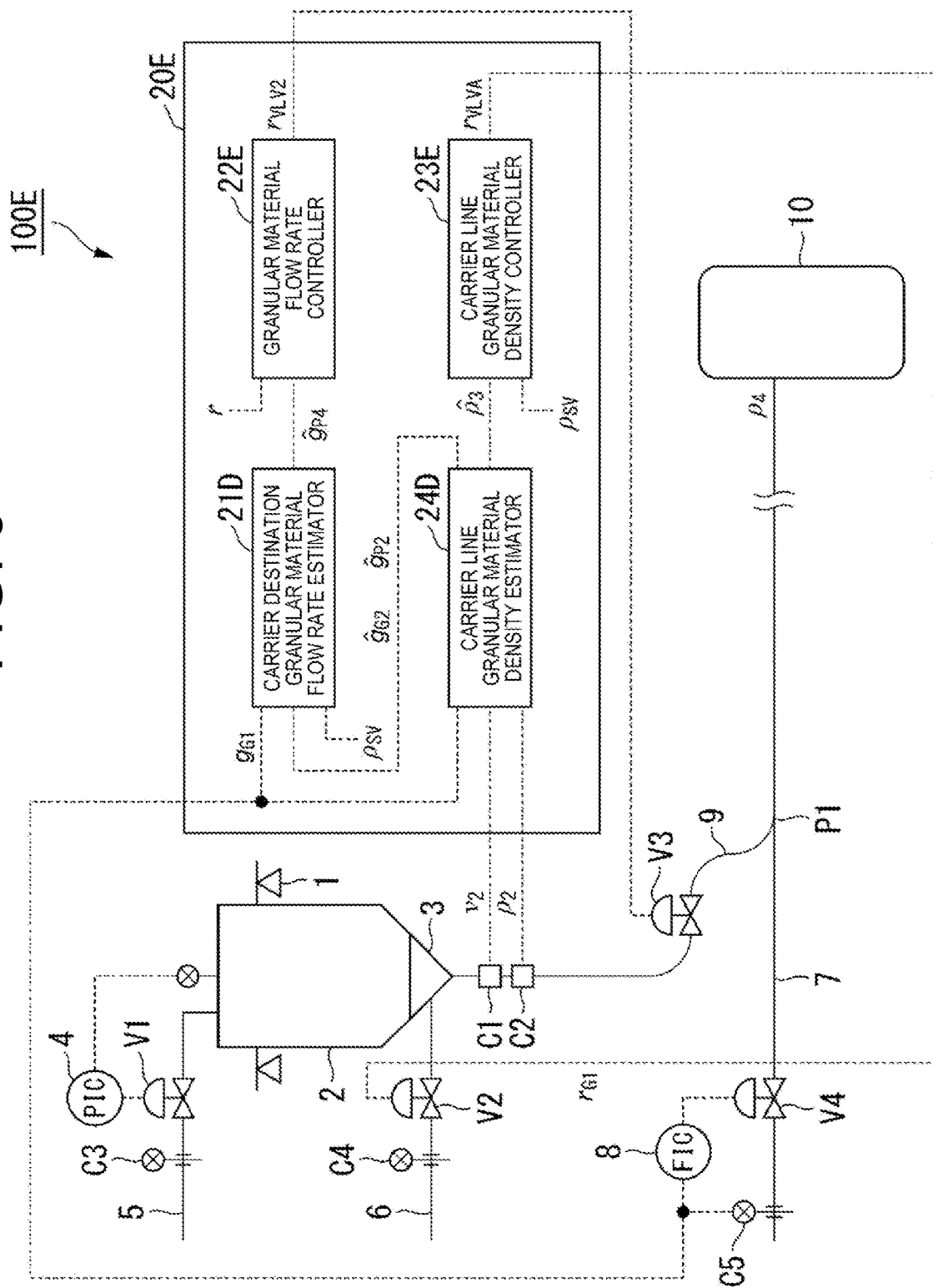
FIG. 9 is a view illustrating an example of a granular material supply system according to a sixth embodiment.

FIG. 9 is a view illustrating an example of the granular material supply system according to the sixth embodiment.

In the configuration according to the sixth embodiment, the same components as those of the granular material supply systems according to the second embodiment and the fourth embodiment are denoted by the same reference numerals, and the description thereof will be omitted. The granular material supply system 100E according to the sixth embodiment includes, downstream of the blow tank 2, the flow velocity sensor C1 that measures the flow rate of granular material and the density sensor C2 that measures the density of granular material. In the sixth embodiment, the illustrated flow rate sensors C3 and C4 are not essential. The granular material supply system 100E according to the sixth embodiment includes a control device 20E instead of the control device 20 of the first embodiment, and the control device 20E includes the carrier destination granular material flow rate estimator 21D, a granular material flow rate controller 22E, a carrier line granular material density controller 23E, and the carrier line granular material density estimator 24D.

The carrier destination granular material flow rate estimator 21D and the carrier line granular material density estimator 24D are similar to those of the fifth embodiment. As compared with the second embodiment and the fourth embodiment, since the granular material density of the cutout line 9 close to the blow tank 2 is measured, it is possible to quickly detect the fluctuation in the granular material density with respect to a change in the opening degree of the aeration line 6 and accurately estimate the granular material density $\rho_3$.

The granular material flow rate controller 22E controls the opening degree of the cutout flow rate control valve V3. The flow rate of granular material required by the carrier facility 10 is assumed to be r (t) (kg/s). For example, using the supply flow rate estimated value $\hat{g}_{P4}$ (t) of granular material estimated by the carrier destination granular material flow rate estimator 21D, the granular material flow rate controller 22E may calculate the command value $r_{VLV2}$(t) of the opening degree of the cutout flow rate control valve V3 at the time t by proportional-integral control (PI control) as in Equation (23) below. $k_P$ is a proportional gain, and $T_I$ is an integral time constant.

Equation 21

$$r_{VLV2}(t) = k_P\left(r(t) - \hat{g}_{P4}(t) + \int \frac{r(t) - \hat{g}_{P4}(t)}{T_I} dt\right) \quad (23)$$

The carrier line granular material density controller 23E controls the opening degree of the aeration gas flow rate control valve V2. For example, the carrier line granular material density controller 23E may calculate the opening degree command value $r_{VLVA}$ (t) of the aeration gas flow rate control valve V2 at the time t by proportional-integral control (PI control) as in Equation (24) below. $k_P$ is a symbol representing a proportional gain, and $T_I$ is a symbol representing an integral time constant.

Equation 22

$$r_{VLVA}(t) = -k_P\left(\rho_{SV}(t) - \rho_3(t) + \int \frac{\rho_{SV}(t) - \rho_3(t)}{T_I} dt\right) \quad (24)$$

Operation

Next, the flow of granular material supply control by the control device 20E of the sixth embodiment will be described with reference to FIGS. 10A and 10B. The control device 20E repeatedly executes the processing illustrated in FIGS. 10A and 10B in parallel at a predetermined control cycle. The control device 20E stores the value $A_2$ (m$^2$) of the cross-sectional area of the cutout line 9.

Figure 10A:
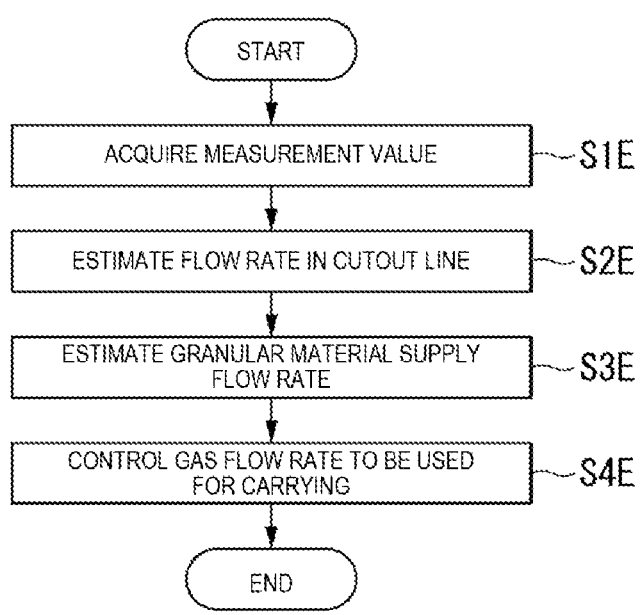
FIG. 10A is a flowchart illustrating an example of gas flow rate control according to the sixth embodiment.

The flow of the flow rate control of carrier gas is shown in FIG. 10A. The carrier line granular material density estimator 24D acquires measurement values measured by the flow velocity sensor C1, the flow rate sensor C5, and the density sensor C2 (step S1E). Next, the carrier line granular material density estimator 24D estimates the flow rate $\hat{g}_{P2}$ (t) of granular material and the gas flow rate $\hat{g}_{G2}$ (t) in the cutout line 9 by using the equations (17) and (18) (step S2E). Next, the carrier destination granular material flow rate estimator 21D estimates the supply flow rate $\hat{g}_{P4}$ (t) of granular material by using the equation (20) (step S3E). Next, the granular material flow rate controller 22E calculates the opening degree command value $r_{VLV2}$ (t) by the flow rate command value r (t) requested by the carrier destination and the equation (23), and controls the opening degree of the cutout flow rate control valve V3, thus controlling the flow rate of the gas flowing out of the blow tank 2 (step S4E).

Figure 10B:
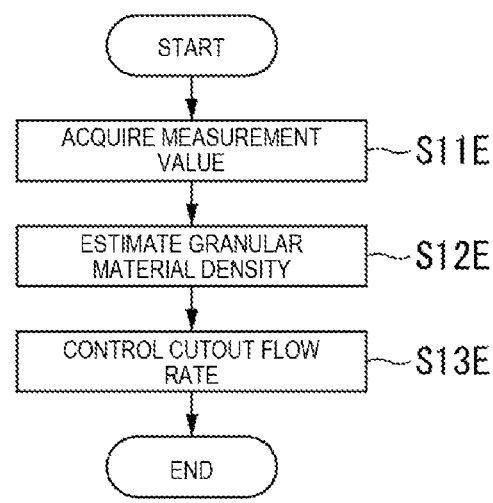
FIG. 10B is a flowchart illustrating an example of granular material density control according to the sixth embodiment.

FIG. 10B shows the flow of control for making the density of granular material at the junction P1 constant. The carrier line granular material density estimator 24D acquires measurement values measured by the flow velocity sensor C1, the flow rate sensor C5, and the density sensor C2 (step S11E). Next, the carrier line granular material density estimator 24D estimates the density of the granular material at the junction P1 by using the equation (19) (step S12E). Next, the carrier line granular material density controller 23E calculates the opening degree command value $r_{VLVA}$ of the aeration gas flow rate control valve V2 by using the equation (24). The carrier line granular material density controller 23E controls the opening degree of the aeration gas flow rate control valve V2 by the calculated opening degree command value $r_{VLVA}$, and controls the density $\rho_3$ of the granular material at the junction P1 to the set value $\rho_{SV}$ (step S13E).

According to the present embodiment, the granular material supply system 100D that supplies granular material from the blow tank 2 to the carrier destination facility 10, while adjusting the opening degree of the aeration gas flow rate control valve V2 so that the density of granular material inside the carrier line coincides with the set value $\rho_{SV}$ based on the estimated value $\hat{\rho}_3$ of the granular material density estimated based on the granular material density and the granular material velocity in the cutout line 9, and adjusts the opening degree of the cutout flow rate control valve V2 so that the carrier gas flow rate coincides with the command value r based on the granular material density and the granular material velocity in the cutout line 9 and the expectation value of the granular material density in the carrier line 7. This can supply granular material to the carrier destination facility 10 at a flow rate as instructed.

Seventh Embodiment

Configuration

Hereinafter, a granular material supply system 100F according to a seventh embodiment of the disclosure will be described with reference to FIG. 11. In the granular material supply system 100F according to the seventh embodiment, a first supply device 30 and a second supply device 31 are provided as supply devices of granular material. The first supply device 30 is, for example, a pulverizer that pulverizes a mass of granular material to generate fine granular material. The first supply device 30 is connected to the carrier line 7 at a junction P2 on the upstream side of the junction P1, and the granular material generated by the first supply device 30 is supplied to the carrier line 7 at the junction P2 and carried to the carrier destination facility 10 by the carrier gas (or the gas cut out from the blow tank 2). The first supply device 30 supplies the pulverized granular material to the carrier line 7, but its amount is not constant, and does not control the granular material density or the carrier gas flow rate. The second supply device 31 includes the blow tank 2, any one of the control devices 20 to 20E, the aeration gas flow rate control valve V2, the cutout flow rate control valve V3, and the carrier gas flow rate control valve V4, and controls the opening degree of the cutout flow rate control valve V3 or the aeration gas flow rate control valve V2 such that the granular material density at the junction P1 becomes $\rho_{SV}$ while monitoring the granular material density at the junction P1, for example. The second supply device 31 controls the carrier gas flow rate control valve V4 or the cutout flow rate control valve V3 so that the supply flow rate of granular material becomes the command value r (t). When the cutout flow rate control valve V3 and the carrier gas flow rate control valve V4 are controlled by the second supply device 31, any of the control methods of the first, third, and fifth embodiments can be applied. When the aeration gas flow rate control valve V2 and the cutout flow rate control valve V3 are controlled by the second supply device 31, any of the control methods of the second, fourth, and sixth embodiments can be applied.

Figure 11:
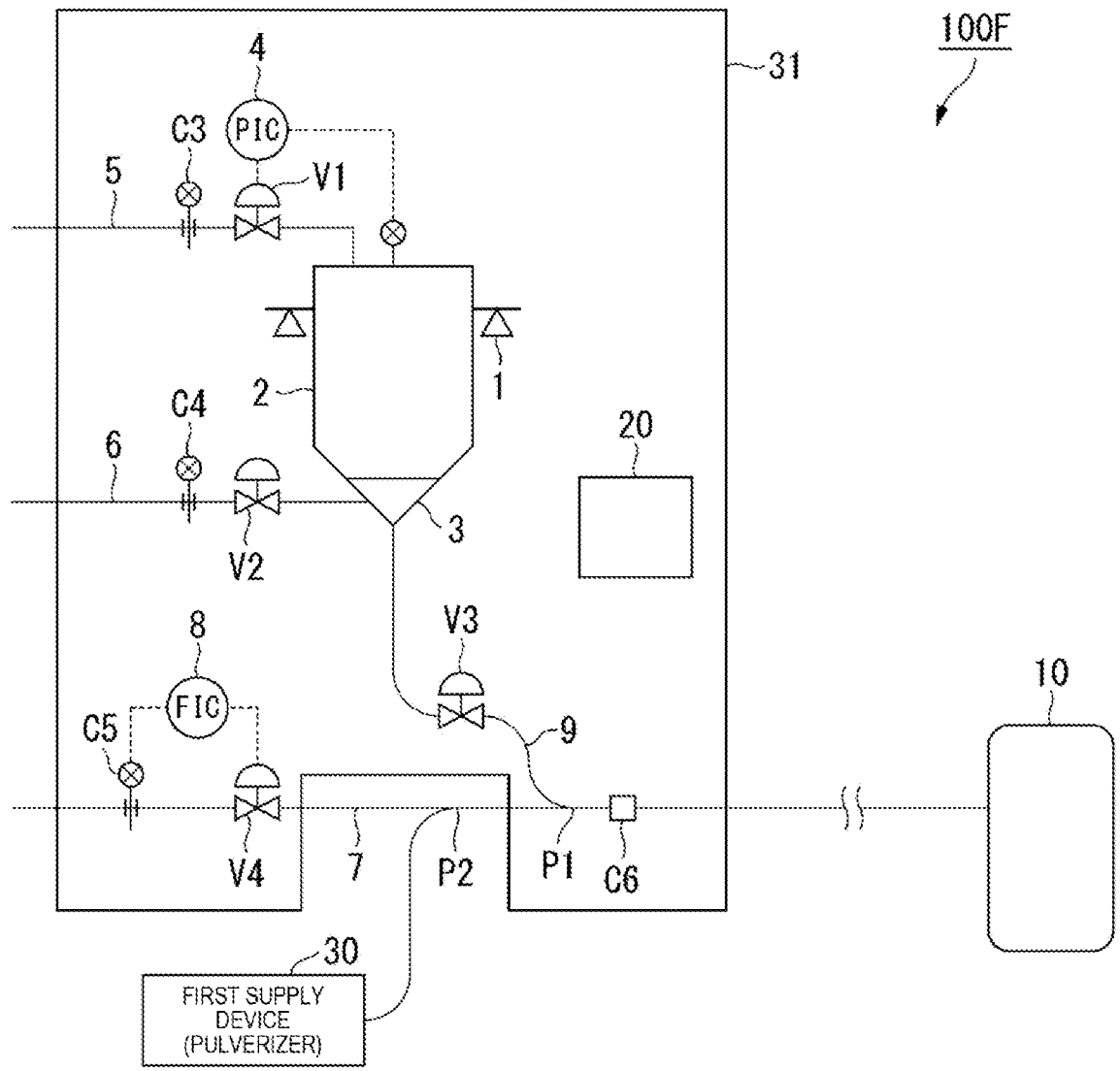
FIG. 11 is a view illustrating an example of a granular material supply system according to a seventh embodiment.
Figure 12:
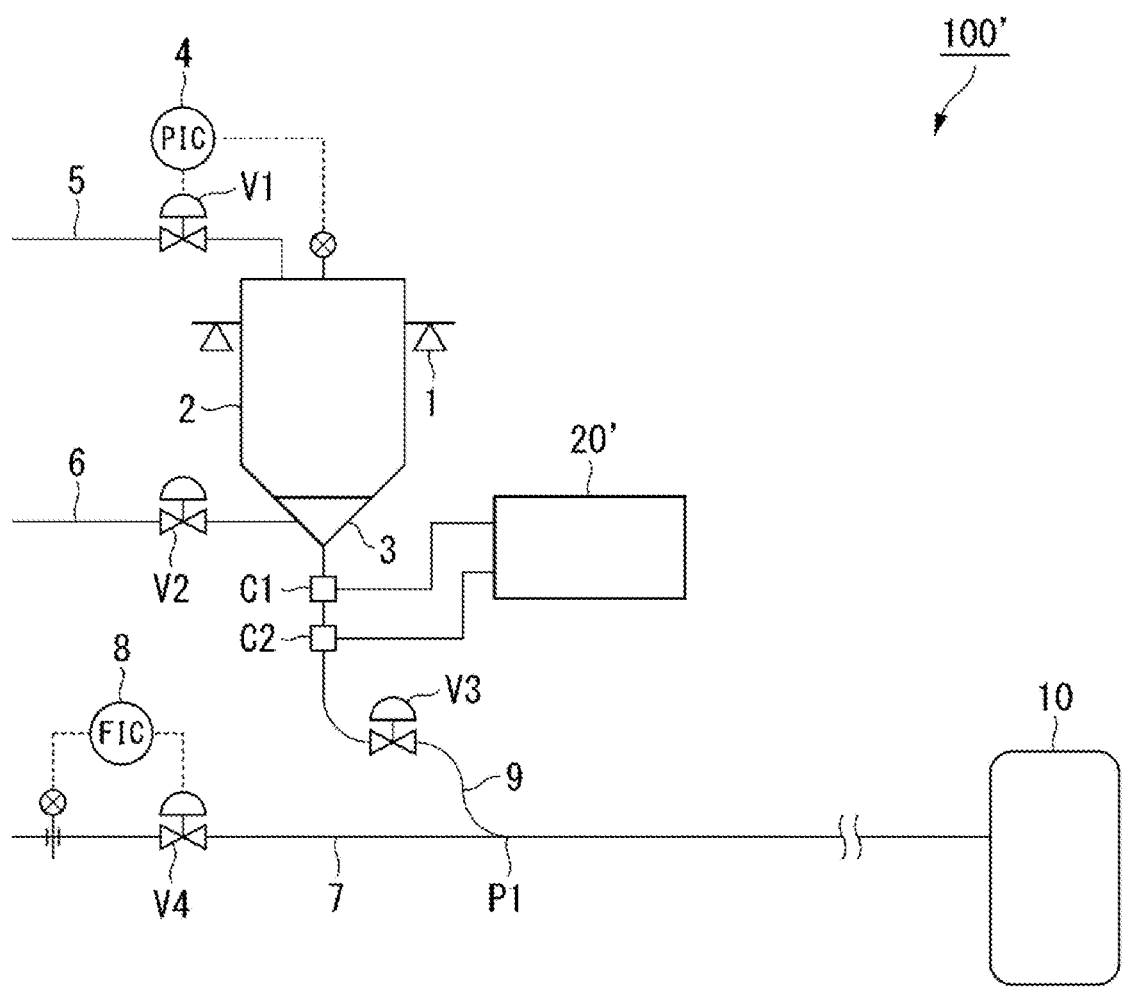
FIG. 12 is a view illustrating an example of a common granular material supply facility.
Figure 13:
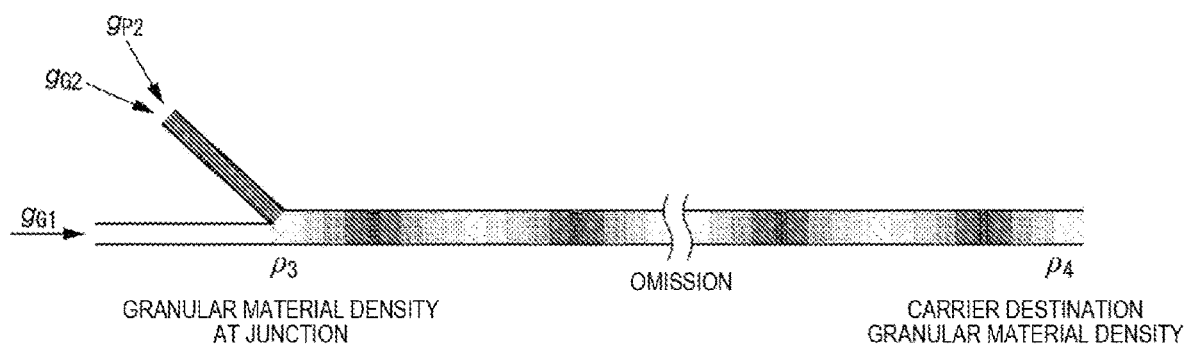
FIG. 13 is a view explaining sparseness and denseness of granular material generated in a carrier line.

FIG. 11 is a view illustrating an example of the granular material supply system according to the seventh embodiment. FIG. 11 illustrates a configuration in a case where the granular material supply system 100 of the first embodiment is applied to the second supply device 31 of the granular material supply system 100F. In the configuration illustrated in FIG. 11, the granular material density of the carrier line 7 is directly measured by the density sensor C6. Thus, the granular material can be simultaneously supplied from a plurality of granular material supply devices. In the first to sixth embodiments, the number of granular material supply devices is one, and the granular material density of the carrier line 7 can be determined by the cutout flow rate from the blow tank 2. On the other hand, the granular material supply system 100F according to the seventh embodiment is extended so as to carry granular material supplied from the plurality of granular material supply devices 30 and 31 to the carrier destination facility 10. A series configuration in which the granular material generated by the first supply device 30 is temporarily stored in the blow tank 2 and carried to the supply destination facility 10 requires the blow tank 2 to have a large capacity. On the other hand, if the second supply device 31 compensates for the temporal variation of the granular material generated by the first supply device 30 while directly carrying the granular material from the first supply device 30 to the carrier destination, a small volume is sufficient for the blow tank 2, which is economical.

Operation

The first supply device 30 generates granular material and supplies the generated granular material to the carrier line 7. In the second supply device 31, the control device 20 performs the processing illustrated in FIGS. 2A and 2B. That is, the control device 20 calculates the opening degree command value $r_{V_LV_2}$ of the cutout flow rate control valve V3 by using the equation (9) based on the granular material density $\rho_3$ at the time t measured by the density sensor C6, and controls the cutout flow rate control valve V3 so that the density $\rho_3$ of granular material at the junction P1 becomes the set value $\rho_{SV}$. The control device 20 estimates the granular material supply flow rate $\hat{g}_{P4}$ (t) at the time t by the measurement values measured by the flow rate sensors C3 to C5 and the equation (7). Furthermore, the control device 20 calculates the command value $r_{G1}$ of the flow rate of the carrier gas by the flow rate command value r (t) and the equation (8), and controls the flow rate of the carrier gas flowing through the carrier line 7.

According to the present embodiment, in addition to the effects of the first embodiment, it is possible to improve the efficiency such as reducing the capacity of the blow tank 2 and suppressing the energy required for storing, into the blow tank 2, the granular material generated by the pulverizer. Although only one first supply device 30 is provided in FIG. 11, a plurality of first supply devices 30 may be provided, and granular material generated by each first supply device 30 may be supplied to the carrier line 7 on the upstream side of the junction P1.

Figure 14:
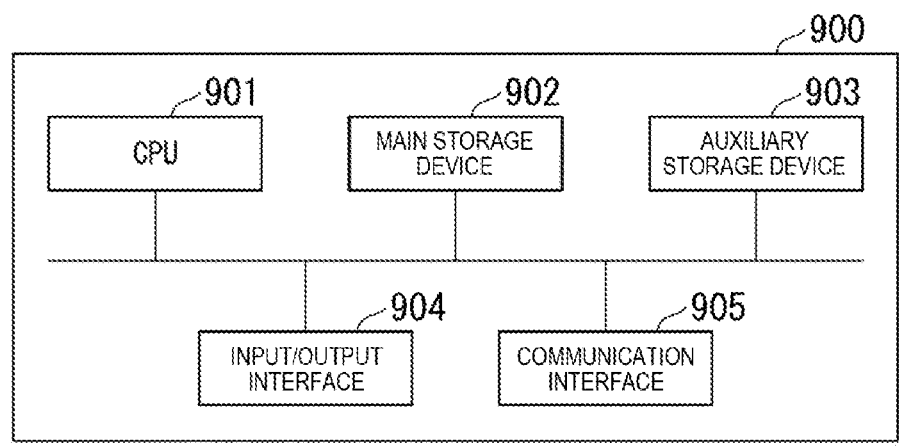
FIG. 14 is a view illustrating an example of a hardware configuration of a control device according to each embodiment.

FIG. 14 is a view illustrating an example of the hardware configuration of the control device according to each embodiment.

A computer 900 includes a CPU 901, a main storage device 902, an auxiliary storage device 903, an input/output interface 904, and a communication interface 905.

The above-described control devices 20 to 20E are implemented in the computer 900. The functions described above are stored in the auxiliary storage device 903 in a format of a program. The CPU 901 reads the program from the auxiliary storage device 903, develops the program to the main storage device 902, and executes the above-mentioned processing in accordance with the program. The CPU 901 secures a storage area in the main storage device 902 in compliance with the program. The CPU 901 secures a storage area for storing data under processing in the auxiliary storage device 903 in compliance with the program.

A program for achieving all or some of the functions of the control devices 20 to 20E may be recorded in a computer-readable recording medium, and the program recorded in the recording medium may be read and executed by a computer system to perform processing by each functional unit. The "computer system" here includes hardware such as an operating system (OS) or peripheral equipment. In addition, if a world wide web (WWW) system is used, the "computer system" also includes a home page providing environment (or a display environment). The "computer readable recording medium" refers to a portable medium such as a CD, a DVD, or a USB, or a storage device such as a hard disk built in a computer system. Further, when this program is distributed to the computer 900 through a communication line, the computer 900 receiving the distribution may develop the program to the main storage device 902, and may execute the above-mentioned processing. The above-described program may implement part of the functions described above, and furthermore, also implement the functions described above in combination with a program already recorded in the computer system.

In the foregoing, certain embodiments of the present disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

Notes

The control devices 20 to 20E, the granular material supply system 100 to 100F, the control method, and the program described in each embodiment are grasped as follows, for example.

(1) The control devices 20 to 20E according to a first aspect in the granular material supply systems 100 to 100F including the tank 2 that stores granular material, the carrier line 7 through which the granular material flowing out of the tank 2 is carried to a carrier destination, and the cutout line 9 that connects the tank 2 and the carrier line 7 and through which the granular material flowing out of the tank 2 is supplied to the carrier line 7 include a density control unit (carrier line granular material density controllers 23 to 23E) for controlling a density of the granular material on a downstream side of the junction P1 of the cutout line 9 and the carrier line 7 to a predetermined set value $\rho_{SV}$; and a flow rate control unit (granular material flow rate controllers 22 to 22E) for controlling a flow rate of the granular material to be supplied to the carrier destination 10 through the carrier line 7 to a command value r (t) instructed by the carrier destination.

This can supply granular material to the carrier destination facility 10 at a flow rate according to the command (first to seventh embodiments).

(2) The control device 20 according to a second aspect is the control device 20 of (1). The granular material supply system 100 further includes the carrier line flow rate control valve V4 provided in the carrier line 7 and the cutout line flow rate control valve V3 provided in the cutout line 9. The density control unit (carrier line granular material density controller 23) controls the opening degree of the cutout line flow rate control valve V3 such that a measurement value (measurement value by the sensor C6) of the density of the granular material on a downstream side of the junction P1 coincides with the set value $\rho_{SV}$ (equation (9)), and the flow rate control unit (granular material flow rate controller 22) controls the opening degree of the carrier line flow rate control valve V4 such that a supply flow rate ($\hat{g}_{P4}$ (t)) to the carrier destination of the granular material estimated based on a total of a carrier gas flow rate ($g_{G1}$ measured by the sensor C5) flowing through the carrier line on an upstream side of the junction P1 and the gas flow rate (gas flow rate measured by the sensor C3+gas flow rate measured by the sensor C4=$g_{G2}$) flowing into the carrier line from the cutout line and the set value $\rho_{SV}$ of the density coincides with the command value r (t).

The granular material flow rate is controlled to the command value r (t) by the opening degree control of the carrier line flow rate control valve V4, and the granular material density is controlled to the set value $\rho_{SV}$ by the opening degree control of the cutout line flow rate control valve V3 based on the measurement value $\rho_3$ of the granular material density, whereby the granular material can be supplied to the carrier destination facility 10 at the flow rate according to the command (first embodiment).

(3) The control device 20A according to a third aspect is the control device 20A of (1). The granular material supply system 100A further includes the aeration line 6 that is connected to a lower portion of the tank 2 and sends, to the tank, a gas for fluidizing the granular material stored in the tank 2, the aeration gas flow rate control valve V2 provided in the aeration line 6, and the cutout line flow rate control valve V3 provided in the cutout line 9. The density control unit (carrier line granular material density controller 23A) controls the opening degree of the aeration gas flow rate control valve V2 such that the measurement value $\rho_3$ of the density of the granular material on a downstream side of the junction P1 coincides with the set value $\rho_{SV}$, and the flow rate control unit (granular material flow rate controller 22A) controls the opening degree of the cutout line flow rate control valve V3 such that the supply flow rate to the carrier destination of the granular material estimated based on the total of a flow rate of a carrier gas flowing through the carrier line on the upstream side of the junction P1 and a flow rate of a gas flowing from the cutout line into the carrier line and the set value of the density coincides with the command value.

The granular material flow rate is controlled to the command value r (t) by controlling the opening degree of the cutout line flow rate control valve V3 and the granular material density is controlled to the set value $\rho_{SV}$ by controlling the opening degree of the aeration gas flow rate control valve V2 based on the measurement value $\rho_3$ of the granular material density, whereby it is possible to supply granular material to the carrier destination facility 10 at a flow rate according to the command (second embodiment).

(4) The control device 20B according to a fourth aspect is the control device 20B of (1). The granular material supply system 100B further includes the carrier line flow rate control valve V4 provided in the carrier line 7 and the cutout line flow rate control valve V3 provided in the cutout line 9. The density control unit (carrier line granular material density controller 23B) controls the opening degree of the cutout line flow rate control valve V3 such that the measurement value $\rho_3$ of the density of the granular material on a downstream side of the junction P1 coincides with the set value $\rho_{SV}$, and the flow rate control unit (granular material flow rate controller 22B) controls the opening degree of the carrier line flow rate control valve V4 such that the supply flow rate to the carrier destination of the granular material estimated based on a measurement value ($V_3$ measured by the sensor C7) of the flow rate of a carrier gas flowing on a downstream side of the junction P1 in the carrier line 7 and the set value $\rho_{SV}$ of the density coincides with the command value.

The carrier line flow rate control valve V4 is controlled so that the granular material flow rate based on the flow velocity of the carrier gas measured by the sensor C7 becomes the command value r (t), and the granular material density is controlled to the set value $\rho_{SV}$ by the opening degree control of the cutout line flow rate control valve V3, whereby the granular material can be supplied to the carrier destination facility 10 at a flow rate according to the command (third embodiment).

(5) The control device 20C according to a fifth aspect is the control device 20C of (1). The granular material supply system 100C further includes the aeration line 6 that is connected to a lower portion 3 of the tank 2 and sends, to the tank, a gas for fluidizing the granular material stored in the tank 2, the aeration gas flow rate control valve V2 provided in the aeration line 6, and the cutout line flow rate control valve V3 provided in the cutout line 9 The density control unit (carrier line granular material density controller 23C) controls the opening degree of the aeration gas flow rate control valve V2 such that the measurement value $\rho_3$ of the density of the granular material on a downstream side of the junction P1 coincides with the set value $\rho_{SV}$, and the flow rate control unit (granular material flow rate controller 22C) controls the opening degree of the cutout line flow rate control valve V3 such that the supply flow rate to the carrier destination of the granular material estimated based on the measurement value ($V_3$) of a flow rate of a carrier gas flowing on a downstream side of the junction P1 in the carrier line 7 and the set value $\rho_{SV}$ of the density coincides with the command value.

The cutout line flow rate control valve V3 is controlled so that the granular material flow rate based on the flow velocity of the carrier gas measured by the sensor C7 becomes the command value r (t) and the granular material density is controlled to the set value $\rho_{SV}$ by the opening degree control of the aeration gas flow rate control valve V2, whereby it is possible to supply granular material to the carrier destination facility 10 at a flow rate according to the command (fourth embodiment).

(6) The control device 20D according to a sixth aspect is the control device 20D of (1) The granular material supply system 100D further includes the carrier line flow rate control valve V4 provided in the carrier line 7 and the cutout line flow rate control valve V3 provided in the cutout line 9. The density control unit (carrier line granular material density controller 23D) controls the opening degree of the cutout line flow rate control valve so that an estimated value of the density of the granular material on a downstream side of the junction calculated based on the flow rate of the granular material flowing through the cutout line, a flow rate of a gas flowing through the cutout line, and a flow rate of a carrier gas flowing through the carrier line on the upstream side of the junction coincides with the set value, and the flow rate control unit (granular material flow rate controller 22D) controls the opening degree of the carrier line flow rate control valve such that the supply flow rate to the carrier destination of the granular material estimated based on the flow rate of the granular material flowing through the cutout line, the flow rate of the gas flowing through the cutout line, the flow rate of the carrier gas flowing through the carrier line on the upstream side of the junction, and the set value of the density coincides with the command value.

The granular material density on the downstream side of the junction P1 is estimated. This can supply granular material to the carrier destination facility 10 at a flow rate according to the command by the opening degree control of the carrier line flow rate control valve V4 and the cutout line flow rate control valve V3 without providing the density sensor C6 (fifth embodiment).

(7) The control device 20E according to a seventh aspect is the control device 20E of (1). The granular material supply system 100E further includes an aeration line that is connected to a lower portion of the tank and sends, to the tank, a gas for fluidizing the granular material stored in the tank, an aeration gas flow rate control valve provided in the aeration line, and a cutout line flow rate control valve provided in the cutout line. The density control unit controls an opening degree of the aeration gas flow rate control valve so that an estimated value of a density of the granular material on a downstream side of the junction calculated based on a flow rate of the granular material flowing through the cutout line, a flow rate of a gas flowing through the cutout line, and a flow rate of a carrier gas flowing through the carrier line on the upstream side of the junction coincides with the set value, and the flow rate control unit controls an opening degree of the cutout line flow rate control valve so that a supply flow rate to the carrier destination of the granular material estimated based on a flow rate of the granular material flowing through the cutout line, the flow rate of the gas flowing through the cutout line, the flow rate of the carrier gas flowing through the carrier line on the upstream side of the junction, and a set value of the density coincides with the command value.

The granular material density on the downstream side of the junction P1 is estimated. This can supply granular material at a flow rate commanded by the carrier destination facility 10 by the opening degree control of the cutout line flow rate control valve V3 and the aeration gas flow rate control valve V2 without providing the density sensor C6 (sixth embodiment).

(8) The granular material supply systems 100 to 100F according to an eighth aspect include the tank 2 that stores granular material, the carrier line 7 through which the granular material flowing out of the tank 2 is carried to a carrier destination 10, the cutout line 9 that connects the tank 2 and the carrier line 7 and through which the granular material flowing out of the tank 2 is supplied to the carrier line 7, and the control devices 20 to 20E according to any one of (1) to (7).

According to the granular material supply systems 100 to 100F, it is possible to supply granular material at a flow rate commanded by the carrier destination facility 10 (first to seventh embodiments).

(9) The granular material supply system 100F according to a ninth aspect is the granular material supply system 100F of (8) further including the supply device 30 that supplies the granular material to the upstream side of the junction P1 in the carrier line 7.

This eliminates temporarily storing, in the blow tank 2, all granular material to be supplied to the carrier destination facility 10.

(10) The control method according to a tenth aspect of the present disclosure includes, in a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line: controlling a density of the granular material on a downstream side of a junction of the cutout line and the carrier line to a set value predetermined; and controlling a flow rate of the granular material to be supplied to the carrier destination through the carrier line to a command value instructed by the carrier destination.

(11) The program according to an eleventh aspect causes a computer that controls a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line to execute processing of controlling a density of the granular material on a downstream side of a junction of the cutout line and the carrier line to a set value predetermined; and controlling a flow rate of the granular material to be supplied to the carrier destination through the carrier line to a command value instructed by the carrier destination.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A control device in a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line, the control device comprising:
 a density control unit configured to control a density of the granular material on a downstream side of a junction of the cutout line and the carrier line to a set value predetermined; and
 a flow rate control unit configured to control a flow rate of the granular material to be supplied to the carrier destination through the carrier line to a command value instructed by the carrier destination.

2. The control device according to claim 1, wherein
 the granular material supply system further includes a carrier line flow rate control valve provided in the carrier line and a cutout line flow rate control valve provided in the cutout line,
 the density control unit controls an opening degree of the cutout line flow rate control valve so that a measurement value of the density of the granular material on the downstream side of the junction coincides with the set value, and
 the flow rate control unit controls an opening degree of the carrier line flow rate control valve so that a supply flow rate to the carrier destination of the granular material estimated based on a total of a flow rate of a carrier gas flowing through the carrier line on an upstream side of the junction and a flow rate of a gas flowing from the cutout line into the carrier line and a set value of the density coincides with the command value.

3. The control device according to claim 1, wherein
 the granular material supply system further includes an aeration line that is connected to a lower portion of the tank and sends, to the tank, a gas for fluidizing the granular material stored in the tank, an aeration gas flow rate control valve provided in the aeration line, and a cutout line flow rate control valve provided in the cutout line,
 the density control unit controls an opening degree of the aeration gas flow rate control valve so that a measurement value of the density of the granular material on the downstream side of the junction coincides with the set value, and
 the flow rate control unit controls an opening degree of the cutout line flow rate control valve so that a supply flow rate to the carrier destination of the granular material estimated based on a total of a flow rate of a carrier gas flowing through the carrier line on the upstream side of the junction and a flow rate of a gas flowing from the cutout line into the carrier line and a set value of the density coincides with the command value.

4. The control device according to claim 1, wherein
 the granular material supply system further includes a carrier line flow rate control valve provided in the carrier line and a cutout line flow rate control valve provided in the cutout line,
 the density control unit controls an opening degree of the cutout line flow rate control valve so that a measurement value of the density of the granular material on the downstream side of the junction coincides with the set value, and
 the flow rate control unit controls an opening degree of the carrier line flow rate control valve so that a supply flow rate to the carrier destination of the granular material estimated based on a measurement value of a flow rate of a carrier gas flowing on the downstream side of the junction in the carrier line and a set value of the density coincides with the command value.

5. The control device according to claim 1, wherein
 the granular material supply system further includes an aeration line that is connected to a lower portion of the tank and sends, to the tank, a gas for fluidizing the granular material stored in the tank, an aeration gas flow rate control valve provided in the aeration line, and a cutout line flow rate control valve provided in the cutout line,
 the density control unit controls an opening degree of the aeration gas flow rate control valve so that a measurement value of the density of the granular material on the downstream side of the junction coincides with the set value, and
 the flow rate control unit controls an opening degree of the cutout line flow rate control valve so that a supply flow rate to the carrier destination of the granular material estimated based on a measurement value of a flow rate of a carrier gas flowing on the downstream side of the junction in the carrier line and a set value of the density coincides with the command value.

6. The control device according to claim 1, wherein
 the granular material supply system further includes a carrier line flow rate control valve provided in the carrier line and a cutout line flow rate control valve provided in the cutout line,
 the density control unit controls an opening degree of the cutout line flow rate control valve so that an estimated value of the density of the granular material on the downstream side of the junction calculated based on a flow rate of the granular material flowing through the cutout line, a flow rate of a gas flowing through the cutout line, and a flow rate of a carrier gas flowing through the carrier line on the upstream side of the junction coincides with the set value, and
 the flow rate control unit controls an opening degree of the carrier line flow rate control valve so that a supply flow rate to the carrier destination of the granular material estimated based on a flow rate of the granular material flowing through the cutout line, the flow rate of the gas flowing through the cutout line, the flow rate of the carrier gas flowing through the carrier line on the upstream side of the junction, and a set value of the density coincides with the command value.

7. The control device according to claim 1, wherein
 the granular material supply system further includes an aeration line that is connected to a lower portion of the tank and sends, to the tank, a gas for fluidizing the granular material stored in the tank, an aeration gas flow rate control valve provided in the aeration line, and a cutout line flow rate control valve provided in the cutout line,
 the density control unit controls an opening degree of the aeration gas flow rate control valve so that an estimated value of the density of the granular material on the downstream side of the junction calculated based on a flow rate of the granular material flowing through the cutout line, a flow rate of a gas flowing through the cutout line, and a flow rate of a carrier gas flowing through the carrier line on the upstream side of the junction coincides with the set value, and the flow rate control unit controls an opening degree of the cutout line flow rate control valve so that a supply flow rate to the carrier destination of the granular material estimated based on a flow rate of the granular material flowing through the cutout line, the flow rate of the gas flowing through the cutout line, the flow rate of the carrier gas flowing through the carrier line on the upstream side of the junction, and a set value of the density coincides with the command value.

8. A granular material supply system, comprising:

a tank that stores granular material;

a carrier line through which the granular material flowing out of the tank is carried to a carrier destination;

a cutout line that connects the tank and the carrier line and through which the granular material flowing out of the tank is supplied to the carrier line; and the control device according to claim 1.

9. The granular material supply system according to claim 8 further comprising:

a supply device configured to supply the granular material to an upstream side of the junction in the carrier line.

10. A control method in a granular material supply system including a tank that stores granular material, a carrier line through which the granular material flowing out of the tank is carried to a carrier destination, and a cutout line that connects the tank and the carrier line and through which the granular material flowing out of the tank is supplied to the carrier line, the control method comprising:

controlling a density of the granular material on a downstream side of a junction of the cutout line and the carrier line to a set value predetermined; and controlling a flow rate of the granular material to be supplied to the carrier destination through the carrier line to a command value instructed by the carrier destination.

* * * * *